(12) United States Patent
Bhushan et al.

(10) Patent No.: US 8,218,573 B2
(45) Date of Patent: Jul. 10, 2012

(54) POWER BOOSTING IN A WIRELESS COMMUNICATION SYSTEM

(75) Inventors: Naga Bhushan, San Diego, CA (US); Peter J. Black, San Diego, CA (US); Rashid Ahmed Attar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1477 days.

(21) Appl. No.: 10/619,781

(22) Filed: Jul. 14, 2003

(65) Prior Publication Data
US 2004/0141525 A1 Jul. 22, 2004

Related U.S. Application Data

(60) Provisional application No. 60/319,888, filed on Jan. 21, 2003, provisional application No. 60/319,889, filed on Jan. 21, 2003.

(51) Int. Cl.
*H04J 3/24* (2006.01)

(52) U.S. Cl. ........ 370/473; 370/252; 370/232; 370/233; 370/234; 370/235

(58) Field of Classification Search .......... 370/473, 370/392, 337, 331, 208, 252, 232–235; 714/748, 714/751, 790; 340/7.44
See application file for complete search history.

(56) References Cited

U.S. PATENT DOCUMENTS

| | | | |
|---|---|---|---|
| 5,774,496 A | 6/1998 | Butler et al. | |
| 5,802,106 A | 9/1998 | Packer | |
| 5,826,172 A * | 10/1998 | Ito et al. | 340/7.44 |
| 5,835,023 A * | 11/1998 | Ito et al. | 340/7.35 |
| 5,914,950 A | 6/1999 | Tiedemann, Jr. et al. | |
| 6,111,863 A | 8/2000 | Rostoker et al. | |
| 6,307,867 B1 | 10/2001 | Johansson et al. | |
| 6,314,101 B1 | 11/2001 | Rezaiifar et al. | |
| 6,577,630 B1 * | 6/2003 | Markwalter et al. | 370/392 |
| 6,671,512 B2 | 12/2003 | Laakso | |
| 6,760,860 B1 * | 7/2004 | Fong et al. | 714/4 |
| 6,778,501 B1 | 8/2004 | Malmgren et al. | |
| 6,907,005 B1 | 6/2005 | Dahlman et al. | |
| 6,907,020 B2 * | 6/2005 | Periyalwar et al. | 370/337 |
| 6,920,598 B2 * | 7/2005 | Chen et al. | 714/748 |

(Continued)

FOREIGN PATENT DOCUMENTS

EP 1024623 8/2000

(Continued)

OTHER PUBLICATIONS

Attar et al., "A Reverse Link Outer-Loop Power Control Algorithm for CDMA2000 1xEV Systems," IEEE International Conference on Communications, 2002. ICC 2002. vol. 1, Apr. 28-May 2, 2002, pp. 573-578.

(Continued)

*Primary Examiner* — Charles Appiah
*Assistant Examiner* — Michael T Vu
(74) *Attorney, Agent, or Firm* — Charles E. Eggers

(57) ABSTRACT

Method and apparatus for power boosting a portion of installments in transmission of a packet of data. The power boosting incorporates a power boost factor for each installment. On receipt of a negative acknowledgement after the power boosted portion of installments, transmission of the sub-packet is terminated, and processing passed to a higher layer.

20 Claims, 24 Drawing Sheets

U.S. PATENT DOCUMENTS

| | | |
|---|---|---|
| 6,931,569 B2 | 8/2005 | Fong et al. |
| 6,999,425 B2 | 2/2006 | Cheng et al. |
| 7,050,405 B2 | 5/2006 | Attar et al. |
| 7,054,275 B2 | 5/2006 | Kim et al. |
| 7,058,124 B2 | 6/2006 | Koo |
| 7,082,107 B1 * | 7/2006 | Arvelo .................. 370/311 |
| 7,133,460 B2 | 11/2006 | Bae et al. |
| 7,158,504 B2 | 1/2007 | Kadaba et al. |
| 7,170,866 B2 * | 1/2007 | Lee et al. .............. 370/311 |
| 7,251,285 B2 | 7/2007 | Lee |
| 7,349,352 B2 * | 3/2008 | Vandermersch ........ 370/261 |
| 7,359,716 B2 | 4/2008 | Rowitch et al. |
| 7,437,654 B2 * | 10/2008 | Das et al. .............. 714/790 |
| 2001/0030955 A1 * | 10/2001 | Lee et al. .............. 370/342 |
| 2001/0033560 A1 * | 10/2001 | Tong et al. ............ 370/337 |
| 2002/0012334 A1 * | 1/2002 | Strawczynski et al. .... 370/337 |
| 2002/0018446 A1 | 2/2002 | Huh et al. |
| 2002/0028691 A1 * | 3/2002 | Moulsley et al. ....... 455/522 |
| 2002/0146980 A1 | 10/2002 | Solondz et al. |
| 2002/0150040 A1 * | 10/2002 | Tong et al. ............ 370/216 |
| 2003/0072296 A1 | 4/2003 | Odenwalder et al. |
| 2003/0112780 A1 | 6/2003 | Ouyang et al. |
| 2003/0206524 A1 | 11/2003 | Mohanty et al. |
| 2004/0141523 A1 | 7/2004 | Bhushan et al. |
| 2005/0058154 A1 * | 3/2005 | Lee et al. .............. 370/473 |
| 2005/0237994 A1 | 10/2005 | Fong et al. |

FOREIGN PATENT DOCUMENTS

| | | |
|---|---|---|
| EP | 1133094 A2 | 9/2001 |
| GB | 2332343 | 6/1999 |
| JP | 2001-094574 | 4/2001 |
| JP | 2005510118 A | 4/2005 |
| JP | 2005525033 A | 8/2005 |
| KR | 1020020000679 | 1/2002 |
| KR | 200329899 | 4/2003 |
| RU | 2316132 | 1/2008 |
| WO | WO0201743 | 1/2002 |
| WO | WO0209342 | 1/2002 |
| WO | WO0209342 A2 | 1/2002 |
| WO | WO 03/043218 | 5/2003 |
| WO | WO03096150 | 11/2003 |

OTHER PUBLICATIONS

Chakravarty et al., "An Algorithm for Reverse Traffic Channel Rate Control for CDMA2000 High Rate Packet Data Systems,"; IEEE Global Telecommunications Conference, 2001. GLOBECOM '01. vol. 6, Nov. 25-29, 2001, pp. 3733-3737.

Esteves, E., "On the Reverse Link Capacity of CDMA2000 High Rate Packet Data Systems," IEEE International Conference on Communications, 2002. vol. 3, Apr. 28-May 2, 2002, pp. 1823-1828.

ETSI TS 25.322 Ver. 2.1.2"Universal Mobile Telecommunication System" (UMTS) rlc Protocol Specification, pp. 1-48 (XP002168713).

European Search Report, EP07006365—Search Authority—Munich Patent Office, May 23, 2007.

International Search Report PCT/US03/014082, International Search Authority European Patent office, Nov. 11, 2003.

* cited by examiner

| DRC VALUE | RATE (kbps) | PACKET LENGTH (SLOTS) |
|---|---|---|
| 0x0 | NULL RATE | N/A |
| 0x1 | 38.4 | 16 |
| 0x2 | 76.8 | 8 |
| 0x3 | 153.6 | 4 |
| 0x4 | 307.2 | 2 |
| 0x5 | 307.2 | 4 |
| 0x6 | 614.4 | 1 |
| 0x7 | 614.4 | 2 |
| 0x8 | 921.6 | 2 |
| 0x9 | 1228.8 | 1 |
| 0xa | 1228.8 | 2 |
| 0xb | 1843.2 | 1 |
| 0xc | 2457.6 | 1 |
| 0xd | INVALID | N/A |
| 0xe | INVALID | N/A |
| 0xf | INVALID | N/A |

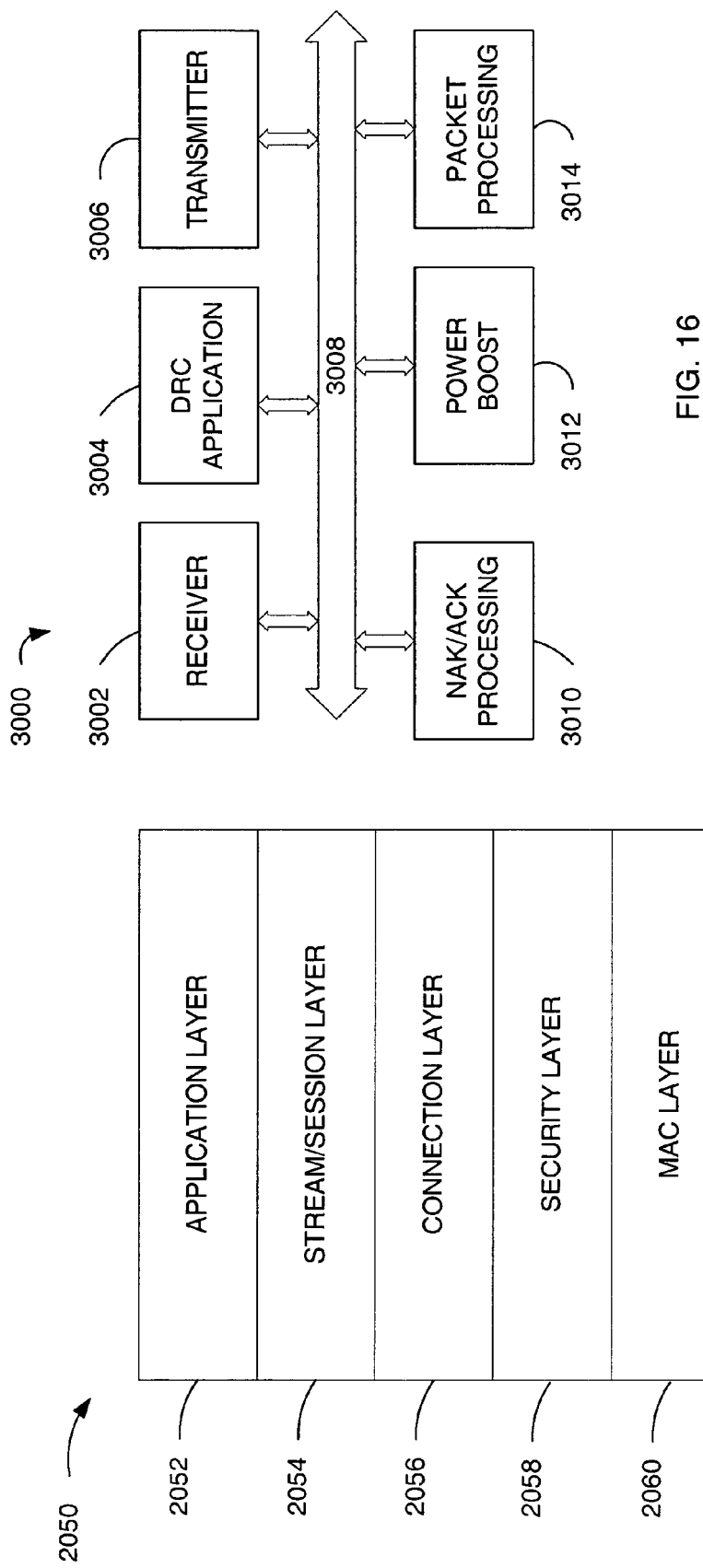

| PAYLOAD SIZE (bits) | EFFECTOVE DATA RATE (kbps) | | | |
| --- | --- | --- | --- | --- |
| | AFTER 1 SUBPACKET | AFTER 2 SUBPACKETS | AFTER 3 SUBPACKETS | AFTER 4 SUBPACKETS |
| [1] 128 | 19.2 | 9.6 | 6.4 | 4.8 |
| [2] 256 | 38.4 | 19.2 | 12.8 | 9.6 |
| [3] 512 | 76.8 | 38.4 | 25.6 | 19.2 |
| [4] 768 | 115.2 | 57.6 | 38.4 | 28.2 |
| [5] 1024 | 153.6 | 76.8 | 51.2 | 38.4 |
| [6] 1536 | 230.4 | 115.2 | 76.8 | 57.6 |
| [7] 2048 | 307.2 | 153.6 | 102.4 | 76.8 |
| [8] 3072 | 460.8 | 230.4 | 153.6 | 115.2 |
| [9] 4096 | 614.4 | 307.2 | 204.8 | 153.6 |
| [10] 6144 | 921.6 | 460.4 | 307.2 | 230.4 |
| [11] 8192 | 1228.8 | 614.4 | 409.6 | 307.2 |

FIG. 22

POWER BOOSTING IN A WIRELESS COMMUNICATION SYSTEM

CLAIM OF PRIORITY UNDER 35 U.S.C. §119

The present Application for Patent claims priority to the following Provisional applications filed in the U.S. Patent & Trademark Office:

U.S. Provisional Patent Application No. 60/319,888, entitled, "Physical ARQ in a Wireless Communication System," filed Jan. 21, 2003, and U.S. Provisional Patent Application No. 60/319,889, entitled, "Physical ARQ in a Wireless Communication System," filed Jan. 21, 2003, both assigned to the assignee hereof.

REFERENCE TO CO-PENDING APPLICATIONS FOR PATENT

The present Application for Patent is related to the following co-pending U.S. Patent Applications:

U.S. patent application Ser. No. 10/620,023, entitled, "Reverse Rate Indicator Detection," filed Jul. 14, 2003 and assigned to the assignee hereof; and U.S. patent application Ser. No. 10/140,087, entitled, "Method and Apparatus for Augmenting Physical Layer ARQ in a Wireless Data Communication System," filed May 6, 2002 and assigned to the assignee hereof.

BACKGROUND

1. Field

The present invention relates generally to the field of data communications, and more particularly, to wireless data communications.

2. Background

In a data communication system, particularly a wireless data communication system, packets of data may be lost for various reasons, including poor channel conditions. The data communicated between two end users may pass through several layers of protocols for assuring proper flow of data through the system, where each layer adds certain functionality to the delivery of the data packet from a source user to a destination user. The proper delivery of data in at least one aspect is assured through a system of checking for error in each packet of data, and automatically requesting a retransmission of the same packet of data (ARQ mechanism), if an error is detected in the received packet of data. Independent ARQ mechanisms may be employed at different protocol layers for flowing data between corresponding end users. The data packets are sequentially delivered from one protocol layer to another. The sequential delivery is performed by transferring a group of data packets at a time in a series of packets of data from one protocol layer to another. A group of data packets may not be transferred until the process for retransmission of the erased packets of data in the group in the lower protocol layer has been completed. The retransmission request for retransmitting an erased packet of data may be repeated several times or the retransmission may take several times until the erased packet of data is received correctly at the destination. As a result, the retransmission process at one protocol layer may slow down the flow of data between different protocol layers in the system. In the mean time, the higher layer protocol may prematurely request for retransmission of all the packets of data in the group including those received successfully at the lower layer, resulting in a very inefficient use of communication resources when flow of data from one protocol layer to another is slow. As such, minimizing the lower layer packet losses due to erasures over the air link is important as much as minimizing the delay of multiple retransmissions, in the event of a packet loss. Therefore, there is a tradeoff between the number of retransmission attempts by a lower layer protocol layer and the delay resulting from such retransmissions that must be considered in the ARQ mechanisms for end-to-end delivery of data packets.

To this end as well as others, there is a need for a method and apparatus to efficiently control flow of data in a communication system.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 15 is a layering architecture consistent with a communication system supporting High Rate Packet Data (HRPD) transmissions.

FIG. 16 is a base station transceiver supporting one embodiment of the present invention.

FIG. 22 is a table corresponding rate and payload information to RRI codes.

DETAILED DESCRIPTION

Figure 1:
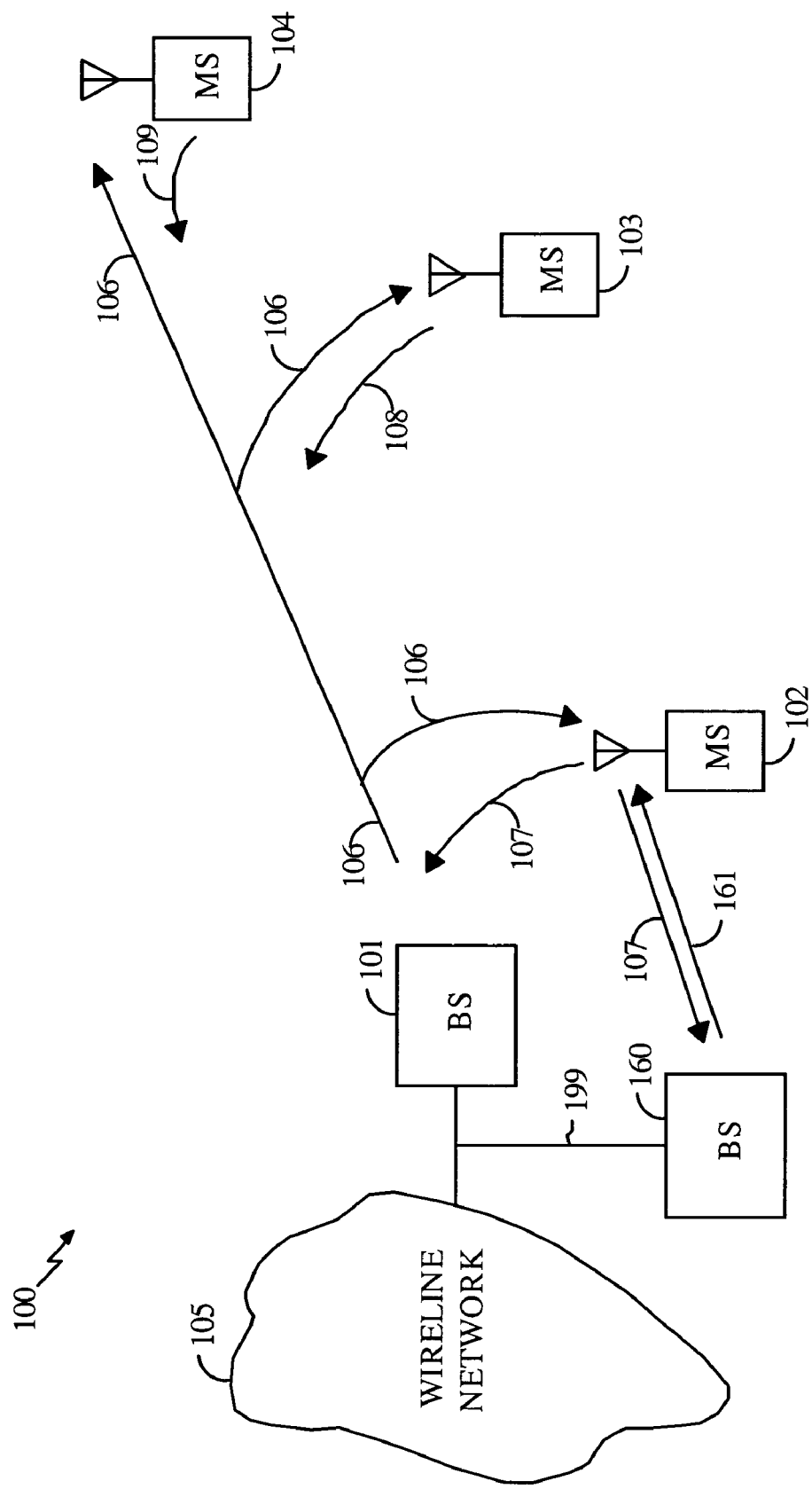
FIG. 1 illustrates a communication system capable of operating in accordance with various embodiments of the invention.

The word "exemplary" is used herein to mean "serving as an example, instance, or illustration." Any embodiment described herein as "exemplary" is not necessarily to be construed as preferred or advantageous over other embodiments.

An HDR subscriber station, referred to herein as an access terminal (AT), may be mobile or stationary, and may communicate with one or more HDR base stations, referred to herein as modem pool transceivers (MPTs). An access terminal transmits and receives data packets through one or more modem pool transceivers to an HDR base station controller, referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Generally stated, various aspects of the invention provide for efficient use of communication resources in a communication system by efficiently determining the need for one more transmission of a physical layer data packet on the forward link based on repeating the decoding of the previously received signal of the acknowledgment channel. Repeating the decoding process may involve use of different decoding thresholds. Subsequently, the retransmission of the physical layer packet may include use of temporal diversity. Various techniques of temporal transmission diversity are well known. One or more exemplary embodiments described herein are set forth in the context of a digital wireless data communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

More specifically, various embodiments of the invention may be incorporated in a wireless communication system operating in accordance with the Code Division-Multiple Access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard. A system for communication of data is also detailed in the "TIA/EIA/IS-856 cdma2000 High Rate Packet Data Air Interface Specification." A copy of the standards may be obtained by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

FIG. 1 illustrates a general block diagram of a communication system 100 capable of operating in accordance with any of the Code Division Multiple Access (CDMA) communication system standards while incorporating various embodiments of the invention. Communication system 100 may be for communications of data, or data and voice. Generally, communication system 100 includes a base station 101 that provides communication links between a number of mobile stations, such as mobile stations 102-104, and between the mobile stations 102-104 and a public switch telephone and data network 105. The mobile stations in FIG. 1 may be referred to as data Access Terminals (AT) and the base station as data Access Network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to communications over a back-haul 199 between network 105 and base stations 101 and 160. Base station 101 communicates with each mobile station that is in its coverage area via a forward link signal transmitted from base station 101. The forward link signals targeted for mobile stations 102-104 may be summed to form a forward link signal 106. Each of the mobile stations 102-104 receiving forward link signal 106 decodes the forward link signal 106 to extract the received information. Base station 160 may also communicate with the mobile stations that are in its coverage area via a forward link signal transmitted from base station 160. Mobile stations 102-104 communicate with base stations 101 and 160 via corresponding reverse links. Each reverse link is maintained by a reverse link signal, such as reverse link signals 107-109 for mobile stations 102-104, respectively. The reverse link signals 107-109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102. The data rate and power level of the reverse and forward links may be maintained in accordance with the channel condition between the base station and the mobile station. The reverse link channel condition may not be the same as the forward link channel condition. The data rate and power level of the reverse link and forward link may be different. One ordinary skilled in the art may recognize that the amount of data communicated in a period of time varies in accordance with the communication data rate. A receiver may receive more data at high data rate than low data rate during the same period of time. Moreover, the rate of communications between the users may also change. A receiver may receive more data at high rate of communications than low rate of communications during the same period of time. Moreover, when communication of a packet of data takes more than one transmission, the effective amount of data communicated over a period of time is reduced. Therefore, the throughput of the communication between a mobile station and a base station may change from time to time based on the channel condition. In accordance with one or more aspects of the invention, efficient use of communication resources in communication system 100 may be made by determining the need for one more retransmission of a physical layer data packet, after being detected as a lost data packet, based on the throughput of the communication between the base station and the mobile station.

In accordance with various aspects of the invention, in communication system 100, re-transmitting a lost packet of data at least one more time after detecting its loss is based on whether a determined throughput of a communication link between a source user and a destination user is above a throughput threshold. The source user may be a base station, such as base station 101 or 160, and the destination user may be any of the mobile stations 102-104. After establishing a forward link communication, loss of the packet of data may be detected by the mobile station. The throughput of the forward link communication may be determined in terms of the communication data rate, rate of communications, number of retransmissions used between the source user and the destination user, or any combination thereof. The retransmission may include use of transmission diversity. Moreover, the reception of the retransmission may include receive diversity. When the throughput is above the threshold, the possibility of receiving the lost packet of data through the retransmission is higher due to a favorable throughput channel condition. Therefore, when the retransmission does not take place due to failure of the throughput for being above the threshold, the communication resources are conserved by being used efficiently. Moreover, when the retransmission takes place, the delay in flow of data among various protocol layers is minimized by providing a timely successful reception of the lost packet of data during favorable throughput channel condition.

Figure 2:
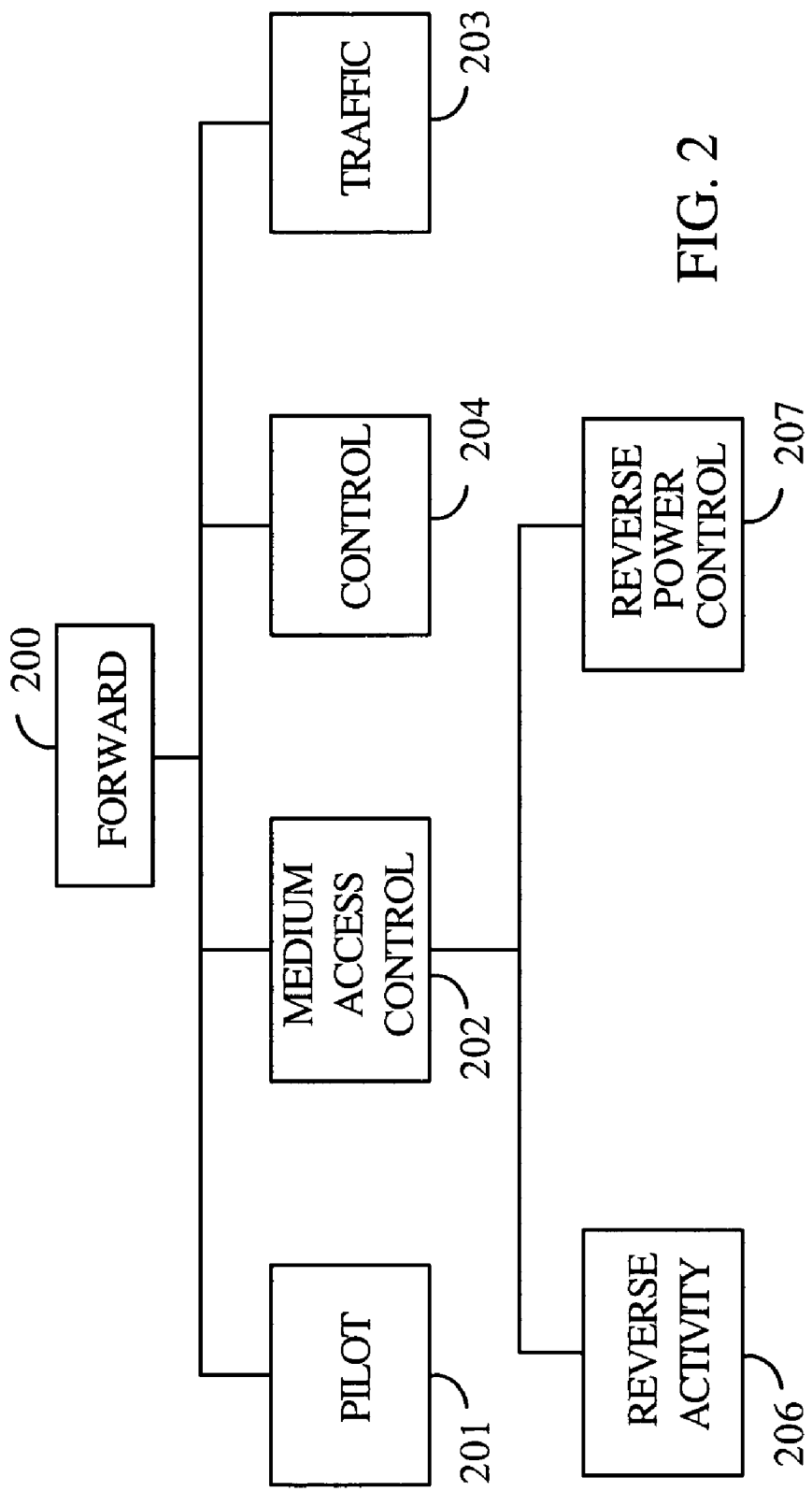
FIG. 2 illustrates the forward link channel structure in a wireless data communication system.

FIG. 2 illustrates a forward channel structure 200 in accordance with an embodiment that may be used for the channel structure of the communications on the forward link. Forward channel structure 200 may include a pilot channel 201, a medium access control (MAC) channel 202, a traffic channel 203 and a control channel 204. The MAC channel 202 may include a reverse activity channel 206 and a reverse power control channel 207. Reverse activity channel 206 is used to indicate the activity level on the reverse link. Reverse power control channel 207 is used to control the power at which a mobile station can transmit on the reverse link.

Figure 3:
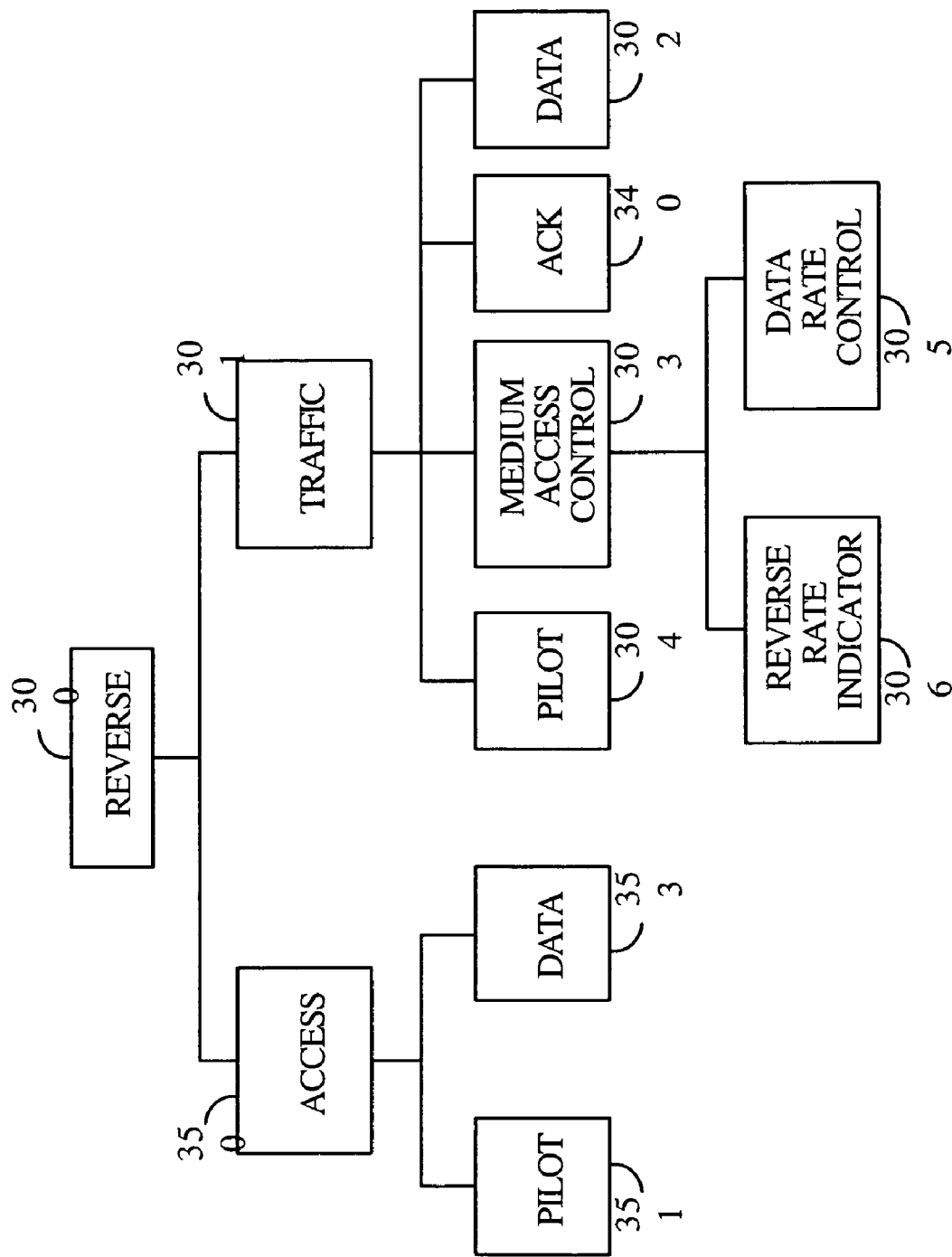
FIG. 3 illustrates the reverse link channel structure in a wireless data communication system.

FIG. 3 illustrates, in accordance with an embodiment, a reverse channel structure 300 that may be used for the channel structure of the communications on the reverse link. Reverse channel structure 300 includes an access channel 350 and a traffic channel 301. Access channel 350 includes a pilot channel 351 and a data channel 353. Traffic channel 301 includes a pilot channel 304, a MAC channel 303, an acknowledgment (ACK) channel 340 and a data channel 302. The MAC channel 303 includes a reverse link data rate indicator channel 306 and a Data Rate Control (DRC) channel 305. Reverse Rate Indicator (RRI) channel 306 is used for indicating the rate at which a mobile station is currently transmitting. Data Rate Control (DRC) channel 305 indicates a data rate that a mobile station is capable of receiving on the forward link. For example, the DRC value 0x3 may indicate the data rate 153.6 kbps. Moreover, the system may require a predefined and limited number of retransmissions of a physical layer packet of data that possibly can take place. For example, at the data rate 153.6 kbps, the system allows up to 3 retransmissions of the same packet of data after the initial transmission, resulting in a total of four transmissions. If the physical layer packet of data is not decoded properly after the initial transmission, as indicated by the ACK channel 340 in the reverse link, the transmitter may send the same packet of data one more time. The retransmission may continue up to three times. The transmitter does not transmit the same packet of data more than four times, one initial time and three retransmissions, when the data rate is at 153.6 kbps. ACK channel 340 is used for communicating whether a received physical layer data packet has been decoded successfully at a mobile station. When a packet of data is lost, even after the maximum allowed retransmissions, in accordance with various aspects of the invention, in communication system 100, re-transmitting the lost packet of data at least one more time may be based on whether a determined throughput of the communication link between the mobile station and serving base station is above a throughput threshold.

ACK channel 340 is transmitted by a mobile station. Transmission on ACK channel 340 may indicate either a negative acknowledgment (NAK) or a positive acknowledgement (ACK). The mobile station may transmit a NAK message as indicated by a single NAK bit to the serving base station until a received physical layer data packet is successfully decoded. The physical layer data packet may be successfully decoded before the maximum number of allowed retransmissions. If a received packet of data is correctly decoded, the mobile station sends an ACK message as indicated by a single ACK bit on the ACK channel 340 to the serving base station. The ACK channel 340 may use a Binary Phase Shift Keying (BPSK) modulation transmitting a positive modulation symbol for a positive acknowledgment and a negative modulation symbol for a negative acknowledgment. In a transmitter described in IS-856 standard, the ACK/NAK bit passes and repeats through a BPSK modulator. The BPSK modulator modulates the ACK/NAK bit, and the resulting signal is Walsh covered in accordance with an assigned Walsh code. In one embodiment, the received signal of the ACK channel 340 may be compared against a positive and negative voltage threshold. If the received signal level meets the positive voltage threshold, an ACK message is considered received on the ACK channel 340. If the signal level meets the negative voltage threshold, a NAK message is considered received on the ACK channel 340.

Figure 4:
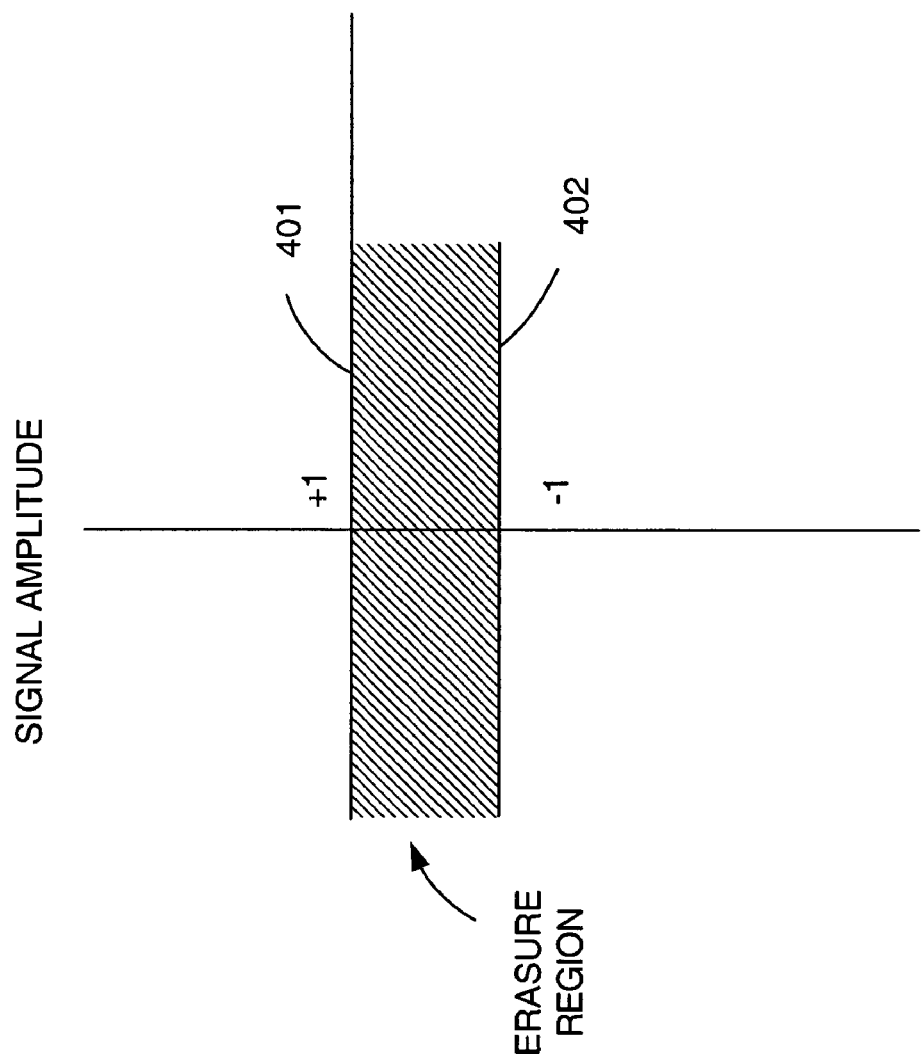
FIG. 4 illustrates decoding of an acknowledgment channel data bit in accordance with various received energy thresholds.

Referring to FIG. 4, decoding of ACK channel 340 may be illustrated. The resulting signal may be compared against a positive threshold 401 and a negative threshold 402. If the signal is above the positive threshold 401, an ACK bit is considered received on the ACK channel 340. If the signal is below the negative threshold 402, a NAK bit is considered received on the ACK channel 340. The positive and negative thresholds 401 and 402 may not be at the same level. As such, an erasure region 403 may be created between the positive and negative thresholds 401 and 402. If the resulting demodulated signal falls in the erasure region 403, the receiving base station may not be able to determine whether an ACK or NAK bit has been transmitted from the mobile station on ACK channel 340.

The ARQ mechanism may have a few problems when the received ACK channel 340 signal is in the erasure region 403. If the erasure is interpreted as an ACK, when in fact a NAK is transmitted from the mobile station, the base station stops transmitting the remaining number of allowed retransmissions of the physical layer data packet. As a result, the mobile station would not receive the physical layer packet of data and may rely on a retransmission mechanism of a higher level protocol layer, such as a Radio Link Protocol (RLP) layer, to recover the lost packet of data. However, the delay in receiving the packet of data and utilization of the communication resources are higher at the RLP layer than the physical protocol layer. One of the measured system qualities may be the certainty associated with proper and on time delivery of a data packet to a mobile station. To avoid such a problem, in one embodiment, the process of decoding the ACK channel may be biased toward detecting a NAK by interpreting an erasure as a NAK. If the mobile station in fact has transmitted an ACK and the serving base station detects an erasure, interpreting the erasure as a NAK allows the base station to continue the transmission of the physical layer data packet for at least one more time of the remaining number of times, when in fact any retransmission of the data packet is not necessary. Such a retransmission, even though may not be necessary, in fact may achieve efficient use of the communication resources with minimal delay for delivery of data packets.

Figure 5:
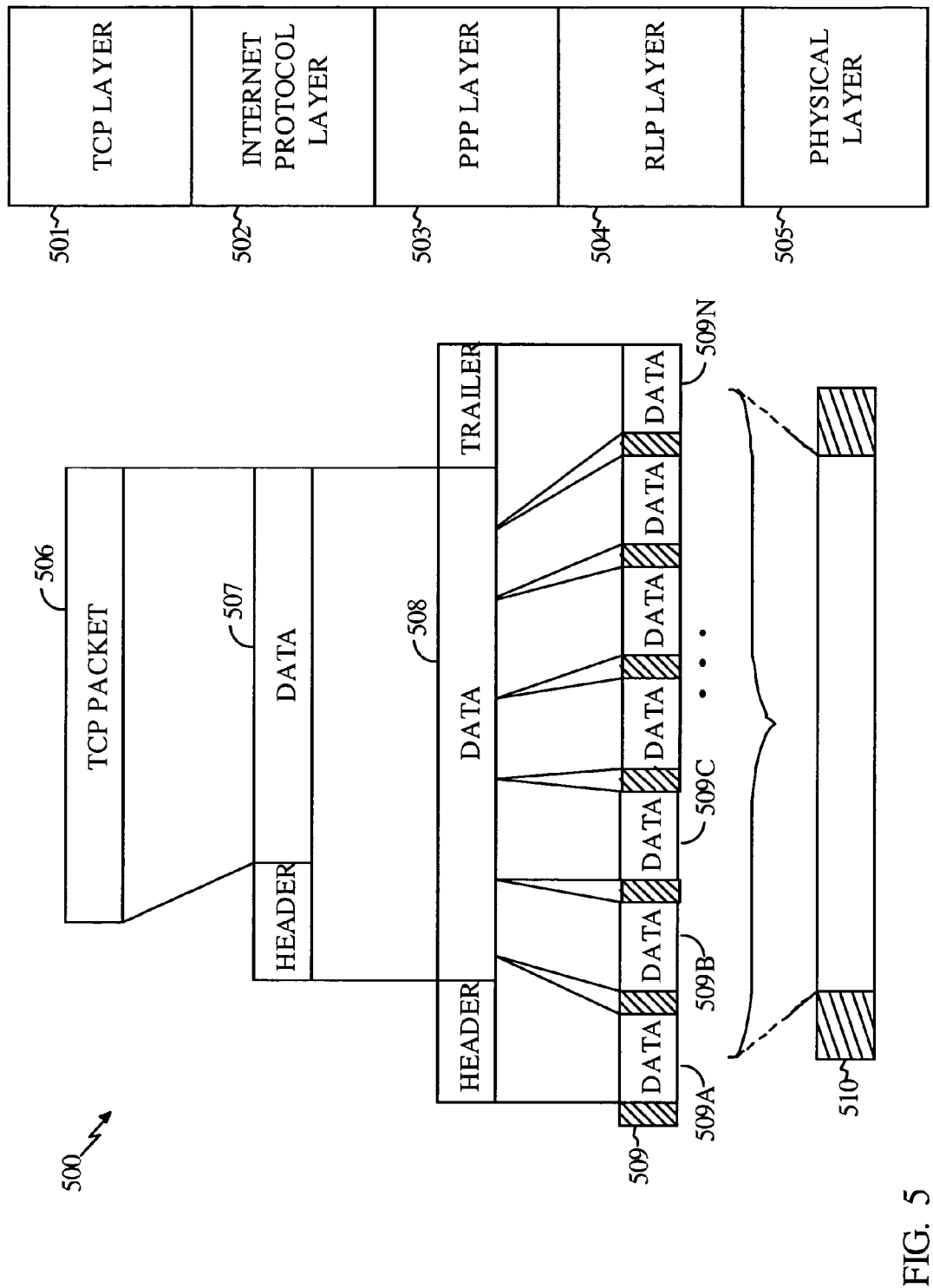
FIG. 5 illustrates a stack of protocol layers for controlling flow of data in a communication system.

The flow of data between two end points may be controlled via several protocol layers. An exemplary stack of the protocol layers 500 is shown in FIG. 5 for controlling flow of data between two end points. For example, one end point may be a source connected to Internet through the network 105. The other end point may be a data processing unit such as a computer coupled to a mobile station or integrated in a mobile station. The protocol layers 500 may have several other layers or each layer may have several sub-layers. A detailed stack of protocol layers is not shown for simplicity. The stack of protocol layers 500 may be followed for flow of data in a data connection from one end point to another. At the top layer, a TCP layer 501 controls the TCP packets 506. TCP packets 506 may be generated from a much larger application data message/packet. The application data may be partitioned into several TCP packets 506. The application data may include text message data, video data, picture data or voice data. The size of the TCP packets 506 may be different at different times. At the Internet Protocol layer (IP) layer 502, a header is added to the TCP packets 506 to produce data packet 507. The header may include a destination address, among other fields, for proper routing of the packets to the appropriate destination node. At a point-to-point protocol (PPP) layer 503, PPP header and trailer data are added to data packet 507 to produce data packet 508. The PPP data may identify the point-to-point connection addresses for proper routing of a packet of data from a source connection point to a destination connection point. The PPP layer 503 may pass data for more than one TCP layer protocol connected to different ports.

A radio link protocol (RLP) layer 504 provides a mechanism for retransmission and recovery of data packets erased over the air. Although TCP has a retransmission scheme for reliable data transfer, the rate of losing packets of data over the air may result in overall poor TCP performance. Implementing an RLP mechanism at a lower layer effectively lowers the rate of losing TCP packets at the TCP level. At RLP layer 504, the data packet 508 is divided into several RLP packets in a group of RLP packets 509A-N. Each RLP packet of the group of the RLP packets 509A-N is processed independently and assigned a sequence number. The sequence number is added to the data in each RLP packet for identifying the RLP packet among the RLP packets in the group of the RLP packets 509A-N. One or more of the RLP packets in the group of the RLP packets 509A-N is placed into a physical layer packet of data 510. A physical layer 505 controls the channel structure, frequency, power output, and modulation specification for data packet 510. The data packet 510 is transmitted over the air. The size of the payload of the packet of data 510 may vary depending on the rate of transmission. Therefore, the size of data packet 510 may be different from time to time based on the channel condition and the selected communication data rate.

At a receiving destination, the physical layer data packet 510 is received and processed. The ACK channel 340 may be used for acknowledging success/failure in reception of physical layer data packet 510 transmitted from a base station to a mobile station. If the physical layer data packet 510 is received without error, the received packet 510 is passed on to RLP layer 504. The RLP layer 504 attempts to reassemble the RLP packets in the group of the RLP packets 509A-N from the received packets of data. In order to reduce the packet error rate seen by TCP 501, the RLP layer 504 implements an automatic retransmission request (ARQ) mechanism by requesting retransmission for the missing RLP packets. The RLP protocol re-assembles the group of the RLP packets 509A-N to form a complete PPP packet 508. The process may take some time to completely receive all the RLP packets in the group of the RLP packets 509A-N. Several physical layer data packets 510 may be needed to completely send all the RLP packets in the group of the RLP packets 509A-N. When an RLP packet of data is received out of sequence, the RLP layer 504 sends an RLP negative acknowledgement (NAK) message on a signaling channel to the transmitting base station. In response, the transmitting base station retransmits the missing RLP data packet.

Figure 6:
FIG. 6 illustrates a table for selecting a maximum number of allowed transmission slots for communication of a packet of data at a selected data rate.

Referring to FIG. 6, a table 600 depicts the DRC value of the DRC channel 305, the corresponding data rate, and the corresponding maximum number of allowed transmissions of a physical layer packet of data. For example, for the DRC value 0x3, the data rate is 153.6 kbps and the corresponding maximum number of allowed transmissions is four time slots. Transmission of a physical layer packet of data may have an early termination or a normal termination. With early termination, the physical layer packet of data has been decoded properly at the receiver and the transmitting source has received an ACK message on the ACK channel 340 corresponding to the received physical layer packet of data. With normal termination, the transmitter has exhausted using all the allowed transmissions slots of the physical layer packet of data without receiving a corresponding ACK message on the ACK channel 340.

Figure 7:
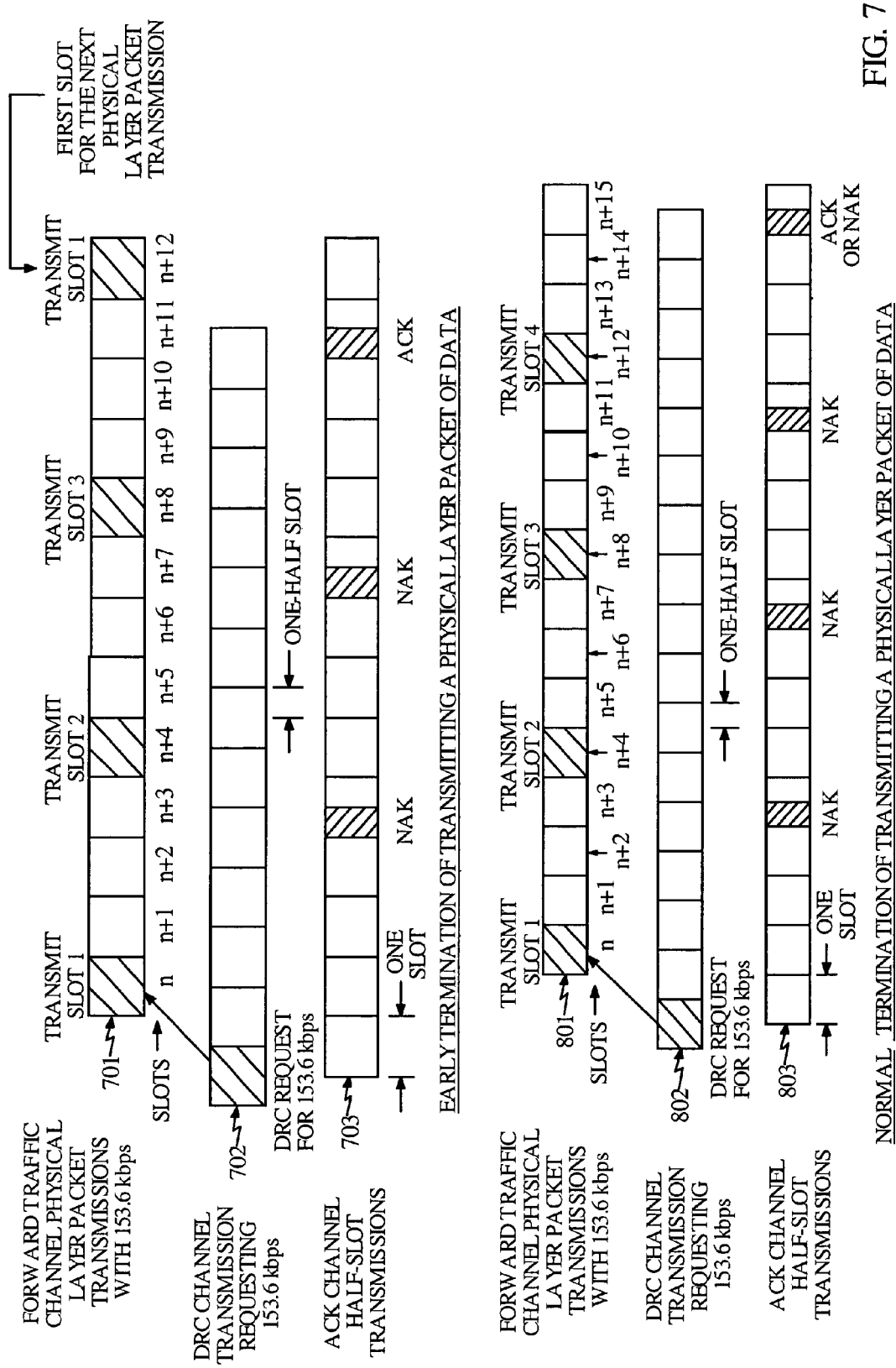
FIG. 7 illustrates early and normal terminations of transmitting a packet of data at the physical layer.

Referring to FIG. 7, an early termination and normal termination for transmitting a physical layer packet of data are illustrated for the case of DRC value 0x3 corresponding to 153.6 kbps data rate. For an early termination in transmission of a physical layer packet of data for the case of DRC value 0x3 corresponding to 153.6 kbps data rate, at a time slot 702 prior to the first transmission of the physical layer packet of data, a DRC value is received on the DRC channel 305. The DRC value is used to determine the communication data rate and the maximum number of allowed retransmissions for the physical layer packet of data. At time slot "n" of the time slots 701, the first transmission of the physical layer packet of data may take place. During the next three time slots, "n+1, n+2, and n+3", the transmitter expects to receive an ACK or NAK on the ACK channel 340. Time slots 703 show that a NAK is received before the time slot "n+4". The first retransmission of the physical layer packet of data takes place during the time slot "n+4". The transmitter waits three more time slots to receive an ACK or NAK on the ACK channel 340. Time slots 703 show that a NAK is received before the time slot "n+8". The second retransmission of the physical layer packet of data takes place during the time slot "n+8". For data rate 153.6 kbps, the transmitter is allowed to make one more transmission of the same physical layer packet of data. The transmitter waits three more time slots to receive an ACK or NAK message on the ACK channel 340. Before the time slot "n+12", an ACK message is received on the ACK channel 340. Therefore, the transmitter makes an early termination of the transmission of the physical layer packet of data before exhausting all the allowed transmission slots. The time slot "n+12" may be used for transmission of another physical layer packet of data.

For a normal termination of transmitting a physical layer packet of data for the case of DRC value 0x3 corresponding to 153.6 kbps data rate, at a time slot 802 prior to the first transmission of the physical layer packet of data, a DRC value is received on the DRC channel 305. The DRC value is used to determine the communication data rate and the maximum number of allowed retransmissions for the physical layer packet of data. At time slot "n" of the time slots 801, the first transmission of the physical layer packet of data may take place. During the next three time slots, "n+1, n+2, and n+3", the transmitter expects to receive an ACK or NAK on the ACK channel 340. Time slots 803 may show that a NAK is received before the time slot "n+4". The first retransmission of the physical layer packet of data takes place during the time slot "n+4". The transmitter waits three more time slots to receive an ACK or NAK on the ACK channel 340. Time slots 803 may show that a NAK is received before the time slot "n+8". The second retransmission of the physical layer packet of data takes place during the time slot "n+8". For data rate 153.6 kbps, the transmitter is allowed to make one more transmission of the same physical layer packet of data. The transmitter waits three more time slots to receive an ACK or NAK on the ACK channel 340. Before the time slot "n+12", a NAK message is received on the ACK channel 340. Therefore, the transmitter makes the last allowed transmission of the physical layer packet of data on the time slot "n+12", and concludes the normal termination of transmitting the physical layer packet of data after exhausting all the allowed transmissions of the physical layer packet of data.

Generally, the transmitter is not required to monitor the ACK channel 340 for detecting whether the last transmission has been received in either success or failure. The physical layer packet may not be successfully received at the mobile station following a normal termination. In this case, the re-assembly of RLP packets of data at the RLP layer 504 would not be complete. As a result, the RLP layer 504 makes a request for retransmission of the RLP packet of data by sending an RLP NAK signaling message.

In accordance with various aspects of the invention, after a normal termination of transmission of a physical layer packet of data, the base station may monitor the ACK channel 340 and if a NAK is received, it may repeat decoding the previously received signal of ACK channel 340 with adjusted ACK/NAK thresholds 401 and 402. The adjustments of the ACK/NAK thresholds 401 and 402 are made such that the decoding is biased toward detection of an ACK message. Such a bias may be created by treating the erasures as ACKs without changing the level of the NAK threshold 402 from the previously used level or by selecting a different threshold altogether.

Figure 8:
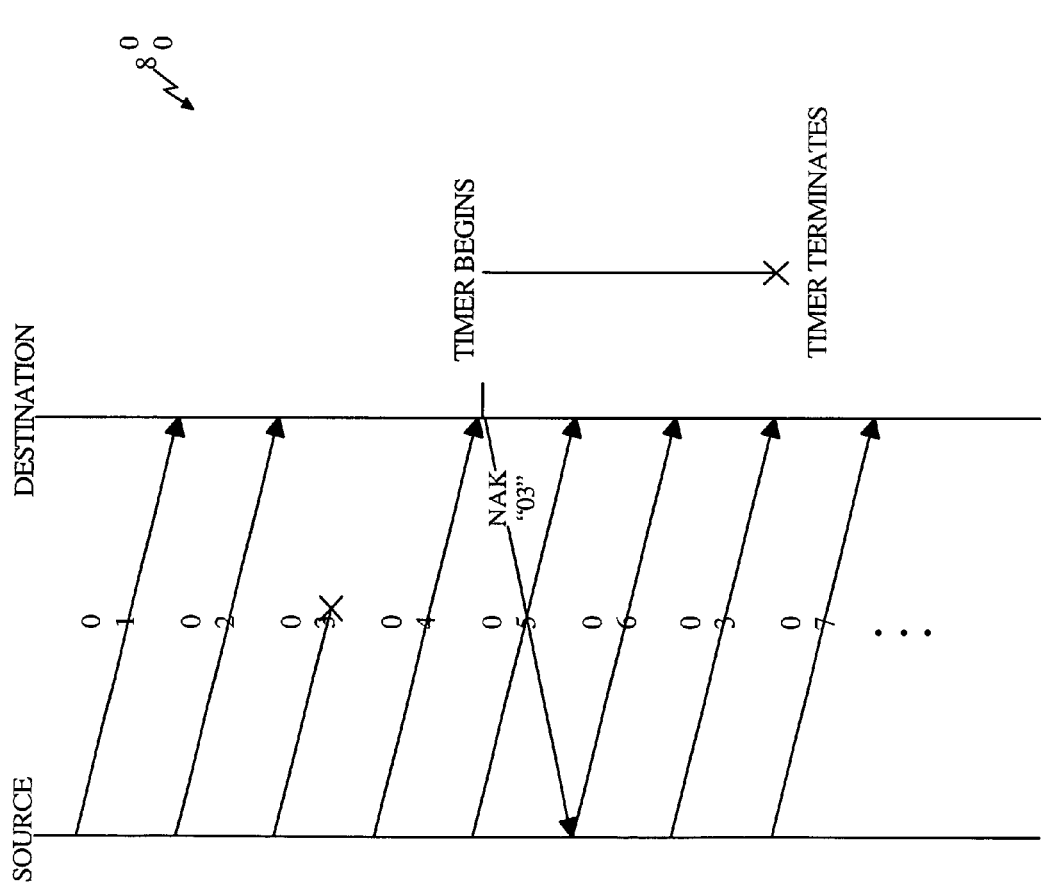
FIG. 8 illustrates an exemplary flow of radio link protocol layer packets of data.

Generally, an ARQ mechanism through the RLP layer takes some time, which includes the round trip delay between the mobile station and the base station as well as the processing delays. Referring to FIG. 8, a message flow 800 is shown to provide an exemplary flow of RLP packets of data. The RLP packets with sequence numbers "01" to "07" are sent from a source to a destination, for example. The source and destination may be, respectively, either a base station and a mobile station or a mobile station and a base station. At the RLP layer 504, the RLP packets 509A-N are accumulated to complete the packet 508. Once all the RLP packets are received, the RLP packets 509A-N are passed on to a higher level. At the physical layer 505, the communication of the physical layer data packet 510 also includes an ARQ method through the use of the ACK channel 340. One or more RLP packets may be combined into a common payload and sent on one physical layer data packet 510. In the exemplary message flow 800, the RLP packet identified as RLP packet "03", for example, does not get to the destination. The failure may be due to many factors including erasure on the radio link between the source and the destination. In this case, the normal termination of transmitting the physical layer packet of data that includes the RLP packet of data "03" may have taken place. After the destination receives RLP packet "04", the RLP layer 504 detects an out of sequence reception of the RLP packets. The RLP layer 504 sends an RLP NAK message identifying RLP packet "03" as missing in the communication. The processing for detection of a missing RLP packet of data, the propagation of the RLP NAK message, and the subsequent RLP retransmission may take some time. The duration may be long enough to allow one quick retransmission of the physical layer of packet of data, beyond the maximum allowed number of retransmissions, for an earlier recovery. If this additional retransmission, in accordance with various aspects of the invention, is successful before transmitting an RLP NAK message, the RLP NAK message may not be transmitted.

When the RLP NAK message is transmitted, the RLP layer 504 starts a timer. The timer counts the lapsed amount of time since sending the RLP NAK message. If the timer expires, for example after 500 msec, before receiving the missing RLP packet "03", the destination RLP 504 may assume that the retransmission of the missing RLP packet has failed. Once the missing RLP packet "03" is received, the timer terminates. The correctly received packets of data may be collected in a storage unit to form a group of packets of data. Therefore, the processing for detection and retransmission of a missing RLP packet of data may take some time. The duration may be sufficiently long so as to allow one more retransmission of the physical layer of packet of data beyond the maximum allowed number of retransmissions. If this additional retransmission is successful before expiration of the timer, the timer may terminate due to receiving the retransmission of the physical layer packet of data successfully. It is possible that the RLP NAK message was sent before the extra physical layer retransmission was successfully received. In such a case either the base station may choose to ignore the received RLP NAK message or it may perform the RLP retransmission of the missing packet, which will be discarded as a duplicate at the mobile station. It is possible that the extra physical layer retransmission may end in a failed normal termination. In this case, the usual RLP retransmission mechanism may provide the recovery of the lost packet.

Figure 9:
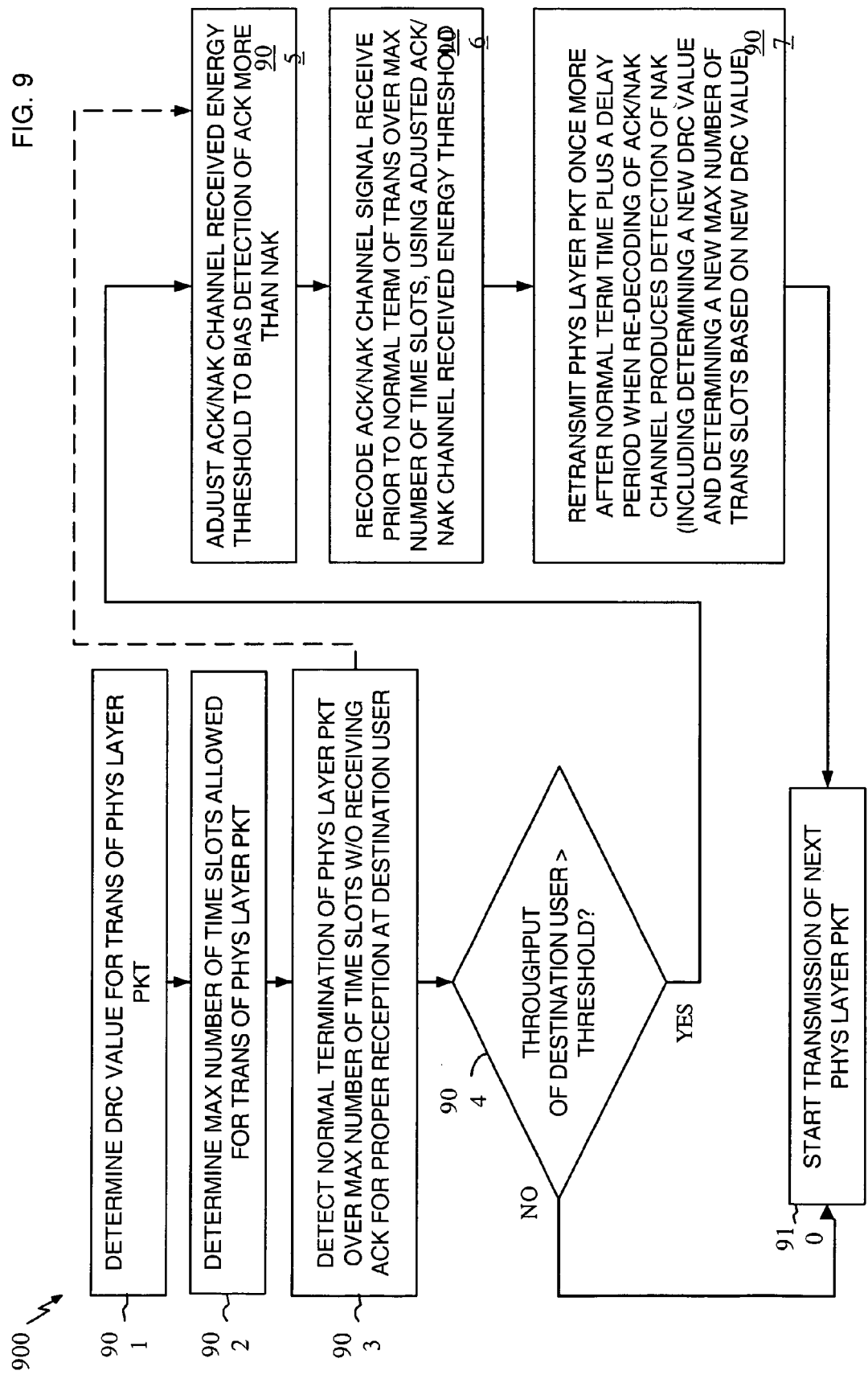
FIG. 9 illustrates a flow diagram of various steps for determining an extra retransmission of a physical layer packet of data in accordance with various aspects of the invention.

FIG. 9 illustrates a method 900 for an ARQ mechanism. At step 901, the transmitter may determine the DRC value for transmission of a physical layer packet of data. The DRC value may be determined by decoding the DRC channel 305. At step 902, the maximum number of time slots allowed for transmission of the physical layer packet of data may be determined by referring to table 600 in FIG. 6. At step 903, the transmitter may detect a normal termination of the transmission of the physical layer packet of data over the maximum number of allowed time slots without receiving a subsequent ACK on the ACK channel 340. At step 905, the ACK and NAK thresholds 401 and 402 may be adjusted to bias towards detection of an ACK message. At step 906, the signal of the previously received ACK channel 340 is re-decoded using the adjusted thresholds to determine the bit on the ACK channel 340. If the re-decoding produces a NAK bit, the physical layer packet of data is transmitted one more round, at step 907. This additional round of transmissions includes a number of transmissions up to maximum allowed slots according to table 600 in FIG. 6 depending on the requested DRC at the time of start of retransmission. At this time, the transmitter may determine a new DRC value by decoding the DRC channel 305 to determine the maximum number of time slots allowed for transmission of the physical layer packet of data. The channel condition may have changed during the process. The new round of transmissions may begin after some delay. The delay may be necessary to allow a de-correlation in the channel condition. When the de-correlation of the channel condition takes place, the probability that the transmission of physical packet of data is successful is higher. The new round of transmissions may be in accordance of a newly received DRC value; thus, the number of allowed retransmissions may be different in this round of transmissions. At step 910, the next physical layer packet of data is transmitted. The last retransmission at step 907 may arrive and be decoded at the destination properly, and possibly eliminating a need for re-transmitting an RLP packet of data. As such, a delayed ARQ (DARQ) at the physical layer is very helpful for efficient communications of data. Channel correlation simply means that if a packet got erased in a slot, it is quite likely that it would get erased again if it were retransmitted immediately. This is particularly a concern in slow fading channel conditions. Thus, it is necessary to temporally de-correlate the retransmission from the lost transmission. This implies that the retransmission should occur at the earliest time that allows sufficient channel de-correlation following the lost transmission. The "Delayed ARQ (DARQ)" is, therefore, used. Simulation studies indicate that a delay of 10 to 20 msec is sufficient, while other delayed time periods are also possible, meets the requirements.

DARQ in accordance with various aspects of the invention may result in significant performance gains for high throughput users under some traffic conditions. The interactions between TCP and the lower layers in a system may result in significant throughput loss for some users under typical (1% packet error rate (PER)) operating conditions. This loss can be attributed to several factors. A forward link loss leading to a RLP retransmission causes a delay in the receipt of the TCP segment affected by the loss, as well as the subsequent TCP segments which were received, but could not be delivered immediately due to the sequential delivery requirement of RLP. This would delay the generation of TCP ACK at the receiver. When the lost packet is recovered due to RLP retransmission, a burst of packets would be delivered to the TCP layer, which would in turn generate a burst of TCP ACK, which may temporarily overload the reverse link. The end result is that the TCP sender may time out, and thus causing a retransmission of packets, which have been successfully received in the first place. Moreover, the congestion window at the TCP sender is reduced to its slow start value (typically one TCP segment) and can take some time to recover before a steady flow of packets can be achieved which may lead to "starvation" of the forward link.

The problems described above can be alleviated to a great degree, if an extra physical layer retransmission is performed on the forward link fairly quickly according to various embodiments. The extra retransmission provides additional robustness. The quickness of the retransmission will help in reducing the delay thus possibly eliminating the TCP sender timeout. Moreover, the quick retransmission will reduce the delay variability seen by the TCP sender, which may lead to improved performance. There are other by-products of such a scheme such as in the case when the last byte in a forward link transmission gets lost. Since this won't generate a NAK from the mobile, the base station maintains a flush timer to cause a forced retransmission. DARQ would result in an automatic retransmission in this case, and a flush timer may not be necessary.

Various aspects of the invention may be useful under many different system conditions, including high throughput condition. The high throughput condition occurs when the channel condition is very favorable for low error rate communications and possibly there are few users in the system. The additional retransmission may provide more gains for high throughput users than low throughput users. For low throughput users, it may result in extra overhead without any benefit. Therefore, to add an additional layer of control for various aspects of the invention, after step 903 and before step 905, the transmitter may determine the throughput of the user receiving the communication. If the throughput is above a throughput threshold, the process moves to step 905 to prepare for deciding whether one additional retransmission of the physical layer packet of data may take place.

Figure 10:
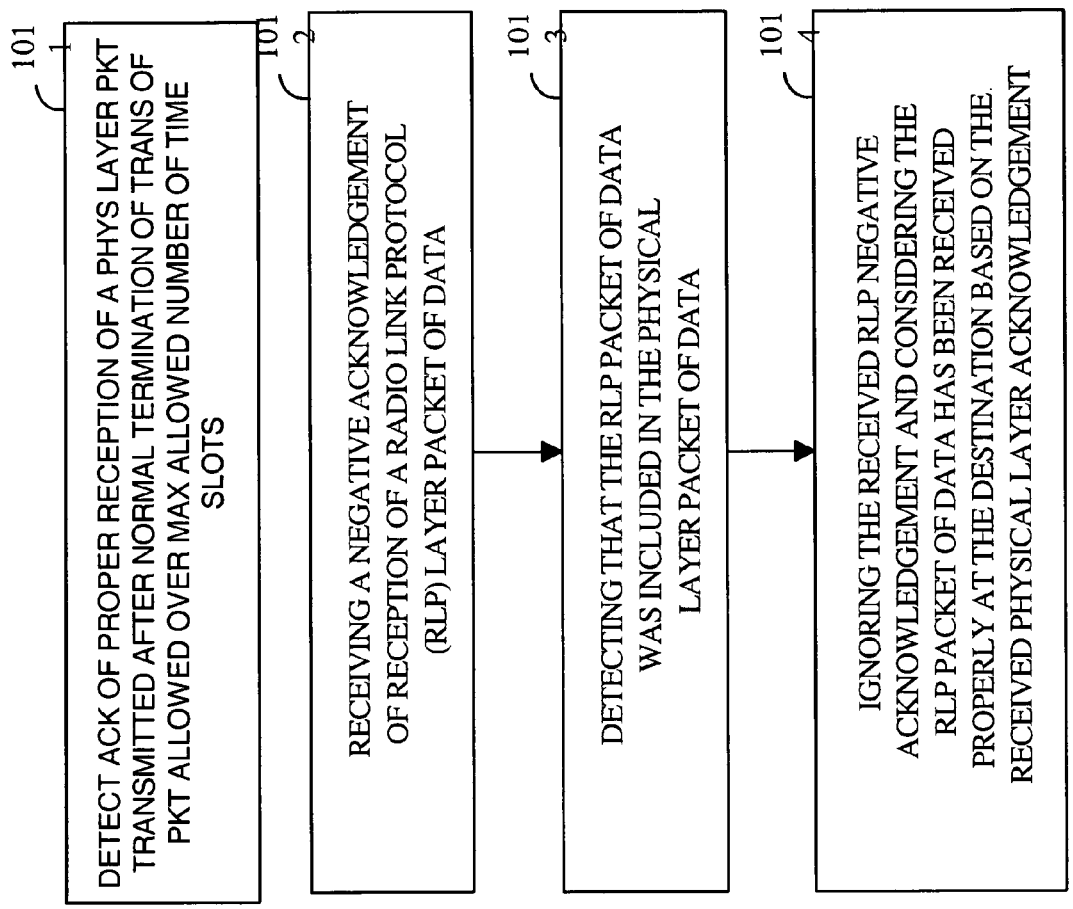
FIG. 10 illustrates a flow diagram of various steps for ignoring a radio link negative acknowledgment in accordance with various aspects of the invention.

After normal termination of transmitting the physical layer packet of data and before completing the extra transmission of the physical layer packet of data, the RLP layer 504 may start and transmit a RLP NAK message. If the RLP NAK message arrives along with an ACK indication on the ACK channel 340 for proper reception of the extra transmission made after the normal termination, the RLP NAK may be ignored in accordance with various aspects of the invention. Various aspects of the invention may be more apparent by referring to flow diagram 1010 shown in FIG. 10. At step 1011, an ACK on the ACK channel 340 is received. The ACK is related to the physical layer packet of data retransmitted after the failed normal termination of the first transmission. At step 1012, a RLP NAK message may also be received. The RLP NAK message may be associated with an RLP packet of data that was included in the physical layer packet of data. Such a detection may be made at step 1013. At step 1014, the received RLP NAK message may be ignored and the controller may consider the RLP packet of data received properly at the destination based on the received ACK bit on the ACK channel 340. The mobile station may delay transmitting the RLP NAK message after detecting that the last transmission of the physical layer packet of data should have taken place, and while not receiving the last transmission.

Figure 11:
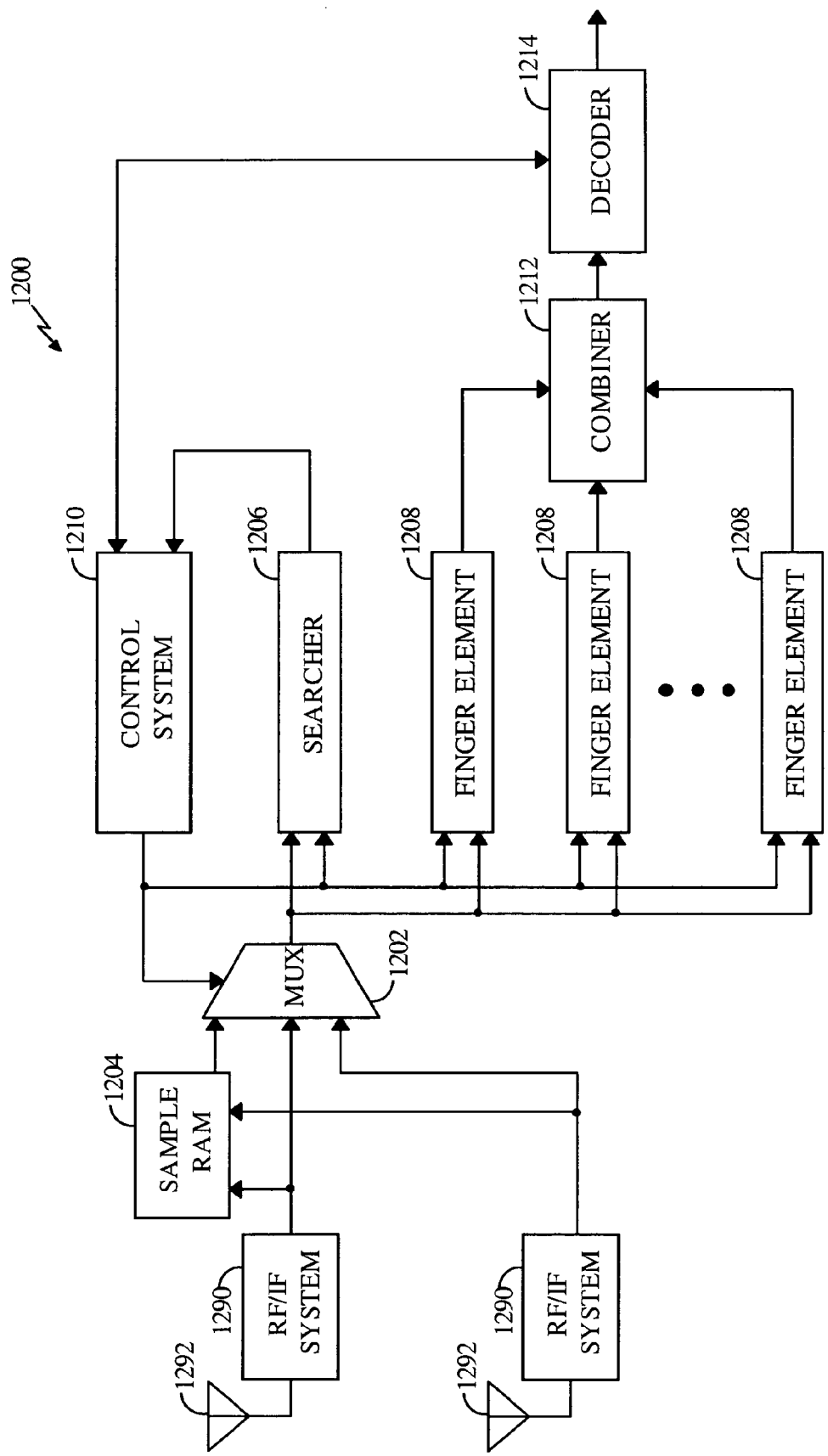
FIG. 11 illustrates a receiver system for receiving and decoding various channels, and capable of operating in accordance with various aspects of the invention.

FIG. 11 illustrates a block diagram of a receiver 1200 used for processing and demodulating the received CDMA signal. Receiver 1200 may be used for decoding the information on the reverse and forward links signals. Received (Rx) samples may be stored in RAM 1204. Receive samples are generated by a radio frequency/intermediate frequency (RF/IF) system 1290 and an antenna system 1292. The RF/IF system 1290 and antenna system 1292 may include one or more components for receiving multiple signals and RF/IF processing of the received signals for taking advantage of the receive diversity gain. Multiple received signals propagated through different propagation paths may be from a common source. Antenna system 1292 receives the RF signals, and passes the RF signals to RF/IF system 1290. RF/IF system 1290 may be any conventional RF/IF receiver. The received RF signals are filtered, down-converted and digitized to form RX samples at base band frequencies. The samples are supplied to a demultiplexer (demux) 1202. The output of demux 1202 is supplied to a searcher unit 1206 and finger elements 1208. A control unit 410 is coupled thereto. A combiner 1212 couples a decoder 1214 to finger elements 1208. Control system 1210 may be a microprocessor controlled by software, and may be located on the same integrated circuit or on a separate integrated circuit. The decoding function in decoder 1214 may be in accordance with a turbo decoder or any other suitable decoding algorithms.

During operation, received samples are supplied to demux 1202. Demux 1202 supplies the samples to searcher unit 1206 and finger elements 408. Control system 1210 configures finger elements 1208 to perform demodulation and despreading of the received signal at different time offsets based on search results from searcher unit 1206. The results of the demodulation are combined and passed to decoder 1214. Decoder 1214 decodes the data and outputs the decoded data. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. Receiver 1200 may be used in a receiver portion of base stations 101 and 160 for processing the received reverse link signals from the mobile stations, and in a receiver portion of any of the mobile stations for processing the received forward link signals.

Figure 12:
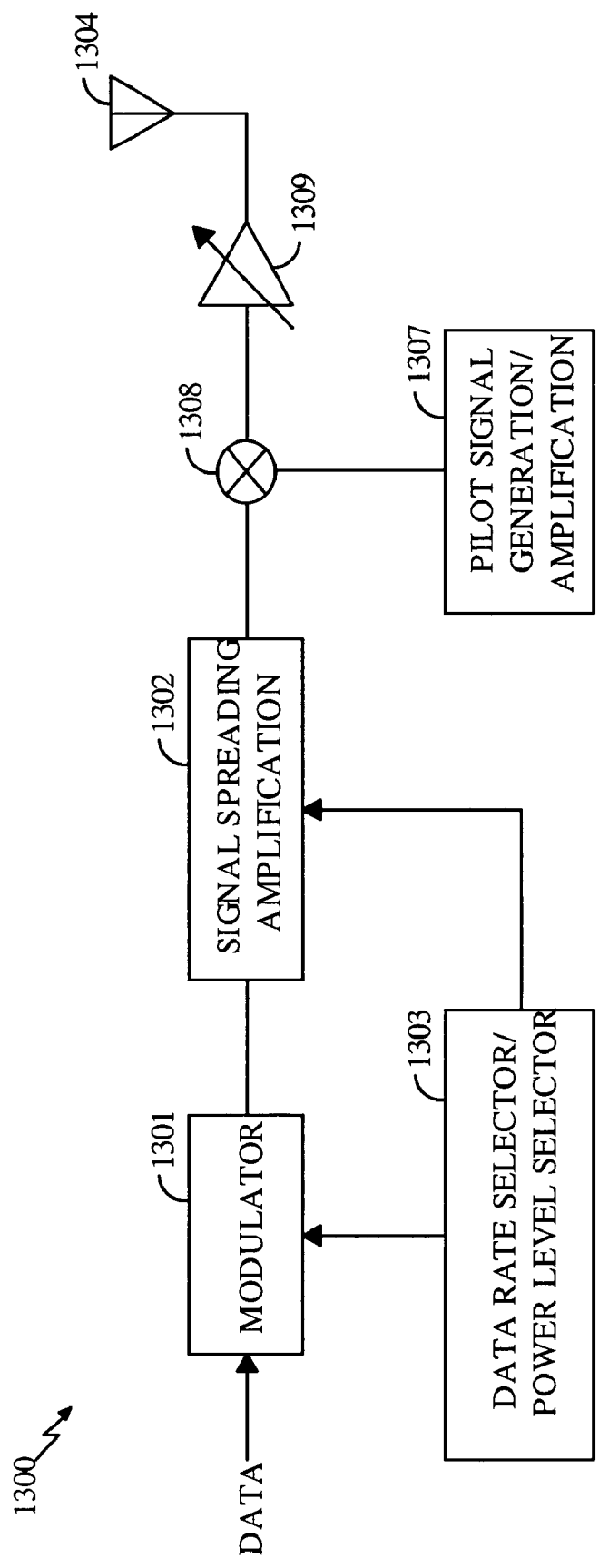
FIG. 12 illustrates a transmitter system for transmitting various channels, and capable of operating in accordance with various aspects of the invention.

FIG. 12 illustrates a block diagram of a transmitter 1300 for transmitting the reverse and forward link signals. The channel data for transmission are input to a modulator 1301 for modulation. The modulation may be according to any of the commonly known modulation techniques such as QAM, PSK or BPSK. The data is encoded at a data rate in modulator 1301. The data rate may be selected by a data rate and power level selector 1303. The data rate selection may be based on feedback information received from a receiving destination. The receiving destination may be a mobile station or a base station. The feedback information may include the maximum allowed data rate. The maximum allowed data rate may be determined in accordance with various commonly known algorithms. The maximum allowed data rate very often is based on the channel condition, among other considered factors. The data rate and power level selector 1303 accordingly selects the data rate in modulator 1301. The output of modulator 1301 passes through a signal spreading operation and amplified in a block 1302 for transmission from an antenna 1304. The data rate and power level selector 1303 also selects a power level for the amplification level of the transmitted signal in accordance with the feedback information. The combination of the selected data rate and the power level allows proper decoding of the transmitted data at the receiving destination. A pilot signal is also generated in a block 1307. The pilot signal is amplified to an appropriate level in block 1307. The pilot signal power level may be in accordance with the channel condition at the receiving destination. The pilot signal is combined with the channel signal in a combiner 1308. The combined signal may be amplified in an amplifier 1309 and transmitted from antenna 1304. The antenna 1304 may be in any number of combinations including antenna arrays and multiple input multiple output configurations.

Figure 13:
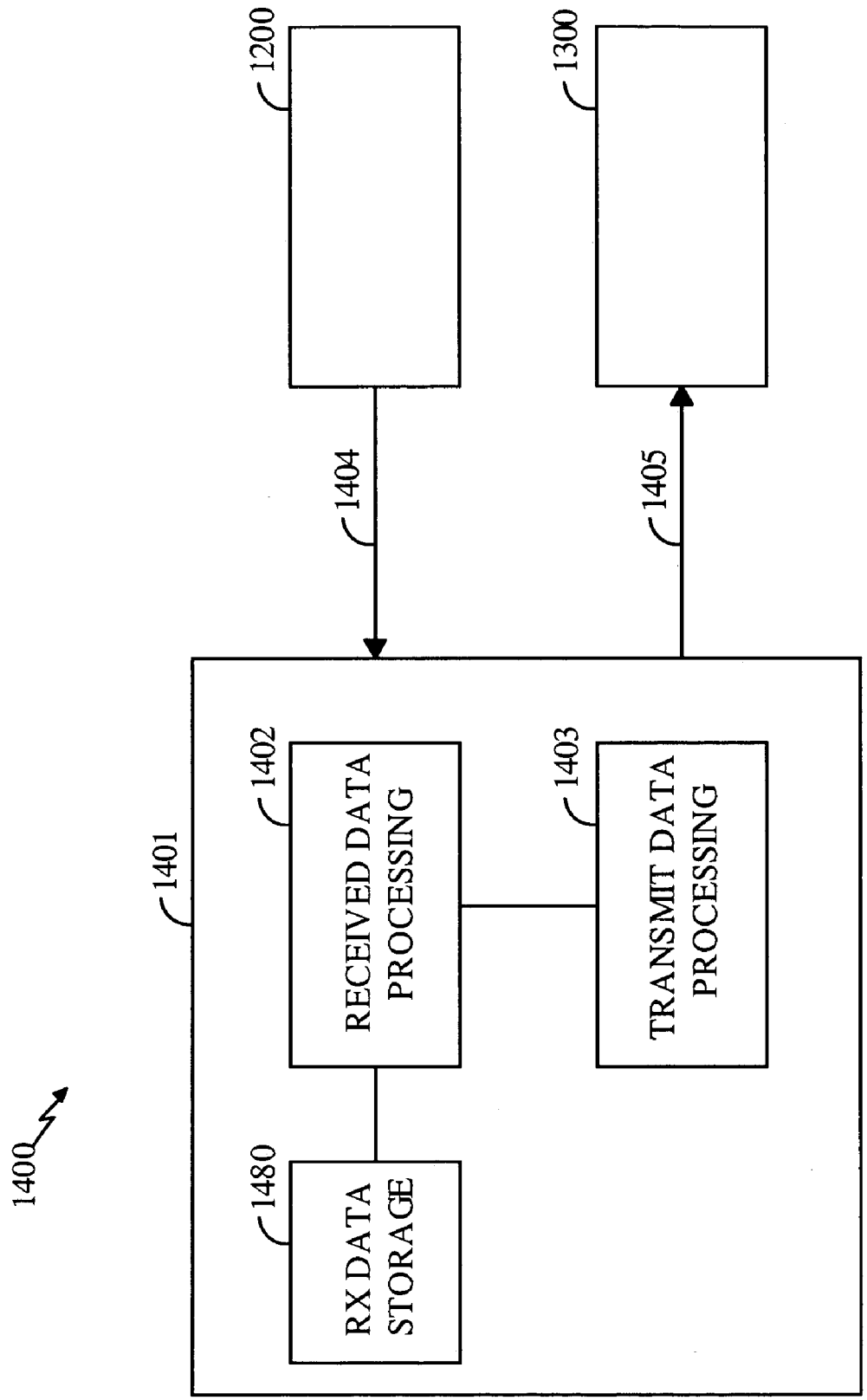
FIG. 13 illustrates a transceiver system for receiving and transmitting various channels, and capable of operating in accordance with various aspects of the invention.

FIG. 13 depicts a general diagram of a transceiver system 1400 for incorporating receiver 1200 and transmitter 1300 for maintaining a communication link with a destination. The transceiver 1400 may be incorporated in a mobile station or a base station. A processor 1401 may be coupled to receiver 1200 and transmitter 1300 to process the received and transmitted data. Various aspects of the receiver 1200 and transmitter 1300 may be common, even though receiver 1200 and transmitter 1300 are shown separately. In one aspect, receiver 1200 and transmitter 1300 may share a common local oscillator and a common antenna system for RF/IF receiving and transmitting. Transmitter 1300 receives the data for transmission on input 1405. Transmit data processing block 1403 prepares the data for transmission on a transmit channel. Received data, after being decoded in decoder 1214, are received at processor 1401 at an input 1404. Received data are processed in received data processing block 1402 in processor 1401. The processing of the received data generally includes checking for error in the received packets of data. For example, if a received packet of data has error at an unacceptable level, the received data processing block 1402 sends an instruction to transmit data processing block 1403 for making a request for retransmission of the packet of data. The request is transmitted on a transmit channel. Various channels, such as the ACK channel 340, may be used for the retransmission process. As such, the control system 1210 and processor 1401 may be used for performing various aspects of the invention including various steps described in relation to flow diagrams 900. A receive data storage unit 1480 may be utilized to store the received packets of data. Various operations of processor 1401 may be integrated in a single or multiple processing units. The transceiver 1400 may be connected to another device. The transceiver 1400 may be an integral part of the device. The device may be a computer or operates similar to a computer. The device may be connected to a data network, such as Internet. In case of incorporating the transceiver 1400 in a base station, the base station through several connections may be connected to a network, such as Internet.

For a communication system incorporating a hybrid ARQ mechanism using incremental redundancy, the data generated by a source may be presented as a sequence of physical-layer packets. At the source, each physical-layer packet is encoded into a finite number of subpackets in such a way that the destination (i.e., receiver) of the packet may potentially decode a packet without receiving all the sub-packets. Note the finite number of subpackets may not be distinct. In one scenario, different subpackets may actually be copies of each other. This is done when each subpacket contains symbols encoded at a sufficiently low code rate. In another scenario, a given subpacket may contain symbols encoded at a high code rate, wherein different subpackets contain different encoded symbols. In this scenario, the combination of multiple subpackets leads to a lower code rate than the code rate of any single subpacket. In particular, the packet may be encoded by a single channel code of sufficiently low rate and the output of the encoder may be split into multiple, redundant fragments. Some fragments may be discarded and others may be replicated to generate the required number of subpackets. In this way, the packet data is sent in installments.

According to one embodiment implementing a hybrid ARQ mechanism, physical layer packets installments are each slightly different, such as wherein systematic bits are consistent but parity bits may be different. At the destination or receiver, the installments of packets are then decoded as a combination. This is in contrast to a simple ARQ scheme, wherein previously received packets are discarded and not considered in decoding the currently received packet. A maximum number of installments is allowed. The system also implements power control which seeks to control the transmit power so as to maintain the Packet Error Rate (PER) after the maximum number of installments at a maximum allowable percent. In one embodiment the PER target is 1%.

It is a desire of high rate packet data systems, such as the 1xEV-DO and/or 1xEV-DV systems, such as specified by cdma2000 and identified by 3GPP2, to maximize data rate and thus throughput while maintaining the PER below or equal to a PER target value. Additionally, there is a desire to reduce the latency in transmission of data packets.

According to one embodiment, the system attempts to achieve the PER using less installments. In this way, the transmit power of the early installments is increased so as to promote reception of the systematic bits as early as possible. This mechanism is referred to as power-boosting. For example, for a case wherein 4 installments are allowed, and a 1% PER specified, the system may power boost the first 2 installments and ignore any NAK after that. In other words, if the transmission is not successfully received on the power boosted installments, no further installments are transmitted, although the time allocated for maximum number of installments may be reserved for this packet installment. Note that the maximum number of installments corresponds to a maximum number of slots used for transmission of the installments.

When the power boost is not successful, the retransmission is not handled further at the physical layer processing, but is handled at a higher processing layer. For example, voice communications may be lost, as latency does not allow extended or delayed retransmission. The higher layer may determine to resend a latency tolerant transmission by implementing power boosting again. In one case, the higher layer, such as the Medium Access Control (MAC) layer, may resend the installment at a later time or may reconfigure the data and repackage with other data. Note the MAC layer in particular monitors processing of packets in a system. The MAC layer may resend later at a higher transmission rate in combination with other data. In this sense, a higher rate may refer to power boosted early slots, or the different coding and/or modulation.

Note that when the transmission is successfully received on the power boosted installments, the system may use the next slot to begin transmission of the next packet. Alternatively, the system may reserve these slot(s) for the current packet and wait the transmission of the next packet until after expiration of the maximum allowable time slots. Additionally note that a packet is typically distributed into multiple subpackets. The concepts described herein are applicable to transmission of a subpacket as well as transmission of a packet. The installments may be for transmission of a subpacket or transmission of a packet.

The source of the physical-layer packet transmits one subpacket at a time on the primary channel, and waits for the destination to send a physical-layer ACK/NAK on the feedback channel, before sending the next subpacket. The destination sends a physical-layer ACK for the packet if it successfully decodes the packet with the help of the subpackets received so far. The destination sends a physical-layer NAK for the packet otherwise. (Not sending anything on the feedback channel may be interpreted either as a ACK or NAK, depending on the convention agreed upon by the two communication end-points.) Generally, the destination sends a physical-layer ACK/NAK as quickly as possible, following the reception of a subpacket.

If the source detects an ACK on the feedback channel, it may discard all the remaining subpackets of the corresponding packet, and may transmit the first subpacket or another physical-layer packet on the primary channel. If the source detects a NAK on the feedback channel, the source transmits any unsent subpacket of the same packet, on the primary channel. If the source detects a NAK but has no more subpackets to send, the source declares a transmission failure and proceeds to send subpackets of another physical-layer packet.

Hybrid ARQ is typically used to combat unpredictable channel variations during the transmission of a packet, as is typical in wireless communications. In such a system, the source may be power controlled by the destination, so that the subpackets are received with the minimum power needed to achieve a (low-enough) target decoding failure rate, after all the subpackets of the physical layer packet have been transmitted. The destination uses the feedback channel to issue power control commands to the source, based on the quality of the primary channel as measured by the destination, as well as the packet decoding failure rate after the last subpacket has been received.

Typically, the packet is decoded by the receiver well before the last subpacket is sent. The hybrid ARQ scheme allows efficient transmission of data on an unpredictable, time-varying channel, with just enough power and just enough redundancy, required for reliable delivery at the destination.

Power Boost Technique

The worst case latency or transmission delay in an ARQ-based system is typically defined as the time required to receive the last subpacket of a given packet at the destination. For some applications, such as real-time applications, the worst case ARQ-induced delay may be unacceptable, compromising the quality of the user experience. It is desirable to reduce the worst-case latency for delay-sensitive application, without causing undue burden or interference to the operation of power control in the system. Generally, the source is aware of the delay-tolerance of the packet prior to transmission.

Generally, the source transmits the packet at the power prescribed by power control operation for delay-tolerant packets, which may withstand the worst case ARQ delay. Alternate processing may be applied to delay-sensitive packets. When the source wants to send a delay-sensitive packet, the source may power boost a portion of the subpackets. In one example, a delay-sensitive packet contains N subpackets, wherein the delay-sensitive packet may only tolerate latency associated with the transmission of at most M subpackets, wherein M<N. In this case, the source transmits the subpackets associated with the delay sensitive packet using a boosted power-level relative to the power-level prescribed by power control. Pi is the transmit power applied to the ith sub-packet as prescribed by the power control commands. The source may actually send the ith subpacket, wherein i is an integer less than or equal to M, at a boosted power level Gi*Pi, wherein Gi represents the power-boost factor of the ith subpacket. The ith subpacket is transmitted only if the source detects a NAK from the destination after the (i−1)th subpacket has been transmitted. If the source detects a NAK after the Mth subpacket has been transmitted, the source simply declares a transmission failure and moves on to the next physical-layer packet.

The power-boost factors Gi, for i=1 to M, is chosen appropriately such that the probability of a decode failure subsequent to transmission of the first M subpackets is equal to the power control target. Given that the power control ensures satisfactory reception of the packet after the transmission of N subpackets, the system determines (for example, through simulation) the power-boost values Gi that ensure (the same level) satisfactory reception after the transmission of just M subpackets. In particular, the system may use a common power boost value, wherein G1 is equal to G2 is equal to GM, etc., that achieves the desired objective. To the first order G is set to a nominal value Gnom=(N/M), wherein N divided by M is greater than or equal to one, is a reasonable choice for low data rate (or low spectral efficiency) transmission over static or fast fading channels. Here, a first order value may be an ideal value or a value calculated using a simplistic system model. In practice, the power boost value may be somewhat larger than the above nominal value to compensate for losses due to coding gain and time diversity.

By applying a well-chosen set of power-boost factors, the source of the packet can unilaterally control the worst-case transmission latency of a physical-layer packet, without impacting the effectiveness of power control or the reliability of packet transmission. Using an average power boost in excess of:

$$Gnom = (N/M) \quad (1)$$

may result in a (small) loss in coverage and/or system capacity, which reflects the price paid to minimize transmission latency on a noisy, time-varying channel. The power boost factors may be calculated empirically. For a static channel if the number of power boost installments is reduced to half the maximum number of installments, then the transmit power may be doubled in the power boost installments. By reducing the number of installments necessary for transmission of a subpacket, the effective data rate is increased significantly.

Figure 14:
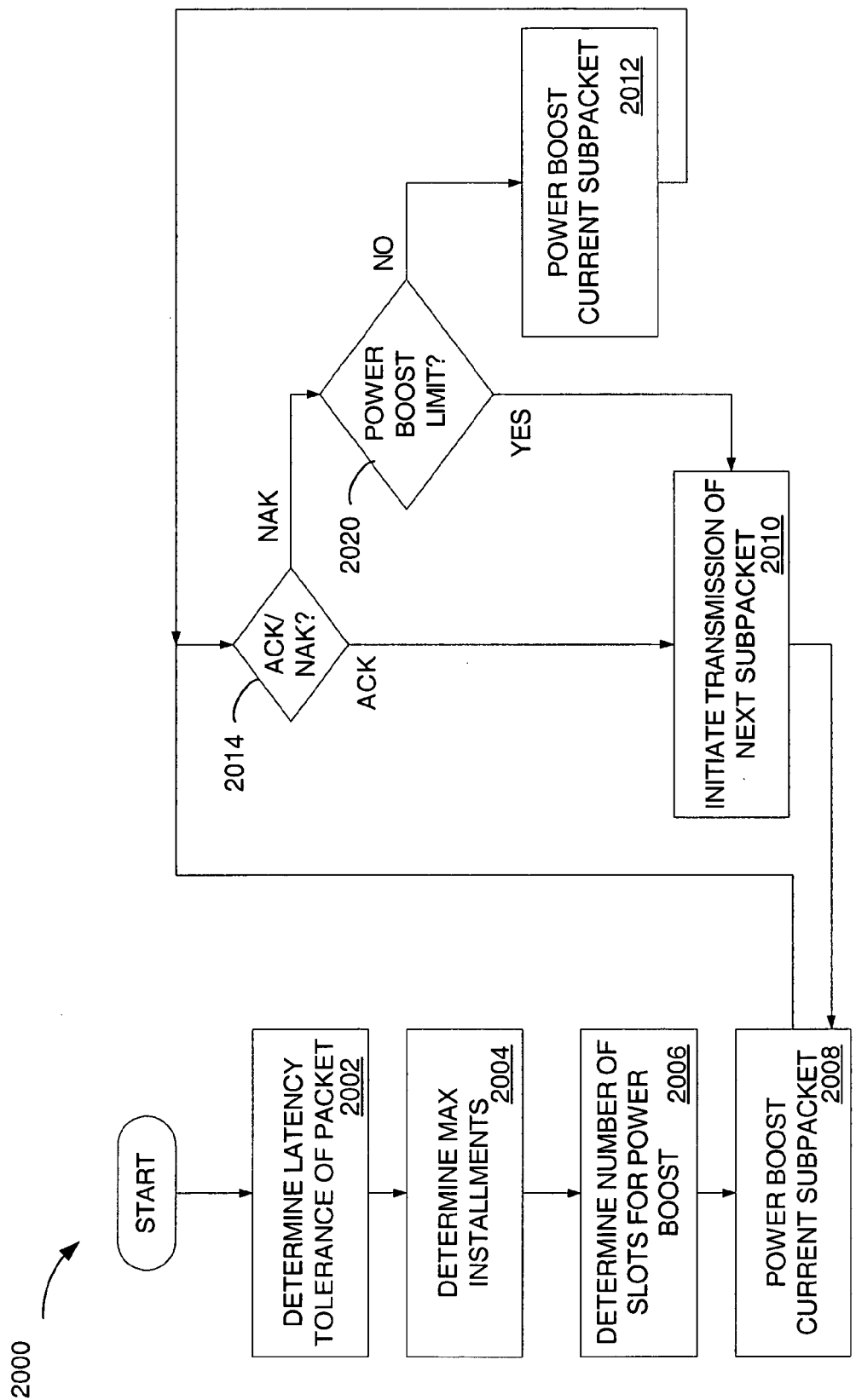
FIG. 14 illustrates a method of control flow implementing power boosting.

FIG. 14 illustrates a power boost mechanism performed at a transmission source according to one embodiment. The method 2000 starts when a data packet is prepared for transmission. The data packet includes a plurality of subpackets. The source determines the latency tolerance of the packet at step 2002. The latency tolerance information is used to determine the power boosting scenario, including number of installments to power boost as well as the power boost factors. At step 2004, the source determines a maximum number installments for the subpacket. The source then determines a number of slots for application of power boosting at step 2006. The source also determines the power boost factor for each of those installments. As each installment is transmitted in a slot, the power boost factor may be considered as applied to an installment in a given slot. Note that the power boost factor Gi applied to each of the individual installments i may have a different value. In one embodiment, a common power boost factor is applied to each installment.

If a negative acknowledgement or NAK corresponding to the transmitted power boosted subpacket is received at decision diamond 2014, processing continues step 2020 to determine if the power boost limit is satisfied, i.e., has the maximum number of slots been power boosted. If the power boost limit has not been satisfied, then processing continues to step 2012 to power boost the current subpacket. When the power boost limit is satisfied at step 202, then processing continues to step 2010 to initiate transmission of a next successive packet. Note that when the power boost limit is satisfied, one embodiment begins transmission of the next successive packet on the next slot. An alternate embodiment allows does not transmit on remaining slots, but allows the slot used for the maximum number of installments before transmitting the next successive packet. When an ACK is received at step 2014, processing continues to step 2010 to initiate transmission of a next subpacket. The next subpacket is not necessarily a next successive packet. See the example of subpacket transmissions illustrated in FIG. 8. In yet another embodiment, one or more bits in the packet are used to indicate the intended number of installments for the transmission of the packet. In this case, if the source receives a NAK after the transmission of the intended number of subpackets, the source transmits the remaining subpackets, until an ACK is received, or until all N subpackets have been transmitted. In this case, the source may transmit the additional subpackets (subpacket M+1, M+2, . . . ) at the nominal gain, as opposed to the power boosted gain. Once the destination decodes the packet, the destination discovers the intended termination target of the packet, and adjusts the power control loop accordingly.

The ACK and NAK for each subpacket identify the corresponding subpacket. Between transmission of the current power boosted subpacket and receipt of the NAK, the source may transmit another subpacket. In this case, when a NAK is received for subpacket i, the subpacket (i+1) may have been transmitted. In this way, transmission and receipt of the subpackets may not occur in sequence. The receiver is adapted to store each of the subpackets until completion of all installments of a packet are completed. The receiver then reassembles the packet. Note that the source waits a given number of time slots for the ACK or NAK. If no ACK or NAK is received, the source may assume an ACK or a NAK. Typically, the source will assume a NAK, and retransmit the subpacket or initiate higher layer processing if the source has exceeded a maximum number of allowable retransmissions. When a maximum number of allowable retransmissions is used without successful receipt by the destination, the source passes processing of the subpacket to higher layer processing, wherein the source determines appropriate action based on the type of data.

MAC-Layer ARQ

As discussed hereinabove, in some situations, the retransmissions are handled by a higher layer processing. The higher layer may resend at a later time and may reconfigure the data by repackaging with other packets. The higher layer used for this processing may depend on the architecture of the layering. A layering architecture 2050 for a communication system supporting High Rate Packet Data (HRPD) consistent with cdma2000, and as specified in IS-856, is illustrated as an example in FIG. 15. The stack 2050 includes layers: application layer 2052; stream/session layer 2054; connection layer 2056; security layer 2058; MAC layer 2060; and physical layer 2062. Application layer 2052 provides multiple applications, including a default signaling application for transporting air interface protocol messages. The stream/session layer 2054 provides multiplexing of distinct application stream and provides address management, protocol negotiation, protocol configuration and state maintenance services. The connection layer 2056 provides air link connection establishment and maintenance services. The security layer 2058 provides authentication and encryption services. The MAC layer 2060 is the Medium Access Control Layer and defines the procedures used to receive and to transmit over the Physical Layer. The physical layer 2062 provides the channel structure, frequency, power output, modulation, and encoding specifications for the Forward and Reverse Channels. Each layer may contain one or more protocols. Protocols use signaling messages or headers to convey information to their peer entity at the other side of the air-link.

The MAC layer monitors the processing of each packet. The MAC layer may be the higher layer reprocessing. A physical layer packet may consist of multiple MAC-layer packets, generated by different applications. Whenever a physical layer packet is not successfully decoded at the destination (for example, when the packet is not decoded even after reception of all sub-packets), then all the MAC-layer packets embedded in the physical layer packet are lost. Some MAC-layer packets may be quite delay-tolerant, but at the same time, highly error-sensitive, requiring a loss rate much less than the target decoder error rate employed by the hybrid-ARQ and power control schemes. Data generated by applications, such as File Transfer Protocol (FTP), which use the Transmission Control Protocol (TCP) transport layer protocol are examples of such error-sensitive packets. There is a need for a mechanism to reduce the effective loss rate of error-sensitive MAC packets beyond the decoder failure rate provided by the ARQ scheme.

If a physical-layer packet fails to decode even after all subpackets have been transmitted, the source may detect the loss of the packet from the physical-layer NAK message received from the feedback channel, after the last subpacket is transmitted on the primary channel. If a lost physical-layer packet contains one or more error sensitive MAC-packets, then these error-sensitive MAC-packets are reinserted into the transmission queue at the MAC layer. Eventually, these MAC-layer packets are embedded into new physical layer packets, and are transmitted using a hybrid ARQ scheme.

In other words, the physical-layer NAK message for the last subpacket transmission is interpreted as an abstract MAC-layer NAK message, for all the error-sensitive MAC-packet embedded in the physical-layer packet. The NAK for the last subpacket is effectively a NAK for the entire physical layer packet. At the MAC layer, this is interpreted as a NAK for all the MAC payload contained in the physical layer packet. Note also that the composition of the new physical-layer packet containing these re-inserted MAC-packets may be different from that of the physical-layer packet that was used to send the MAC-packets in the previous attempt. The entire packet or a part of that packet may be reconfigured and retransmitted. Parts of the packet that contain delay sensitive information need not to be retransmitted. Note that "part of the packet" is not the same thing as a subpacket. The physical layer packet contains data from different applications. A "part of the packet" refers to data from one such application. The different "subpackets" of the same packet contain the same data, encoded in different ways. It is not necessarily the case that each subpacket contains a small part of the physical layer packet. Data from different applications are not distinguished from one another at the physical layer. Such distinction is generally made at the MAC layer or higher.

While reinserting MAC-packets into the transmission queue, the source maintains a minimum delay or wait time prior to retransmission of the data in a physical layer packet. The delay allows the channel to recover from any deep fade, which is most likely the reason for failure of the earlier transmission of the packet, in spite of a fairly elaborate and efficient hybrid ARQ scheme. The additional time diversity resulting from this deliberately induced delay increases the effectiveness of MAC-layer retransmission, providing a highly robust mechanism for transmitting error-sensitive, delay-tolerant data.

Improving the reliability of the physical-layer ARQ messages, in particular the ARQ message associated with the last subpacket, is a goal of system design. Here the final installment of the packet is the last subpacket. The Reverse Link (RL) feedback channel used to transmit the physical-layer ACK/NAK messages is generally designed to be reliable so as to support the target decoder failure rates. However, the physical-layer NAK after the last subpacket transmission may be used as an implicit MAC-layer NAK, which in turn is used to improve the performance of very error-sensitive data. The MAC layer ARQ is generally used to achieve an error rate much smaller than the error rate targeted by the physical layer ARQ. Hence, the feedback channel associated with MAC layer ARQ needs to be much more reliable than the feedback channel of the physical layer ARQ. The reliability of the physical layer ARQ feedback channel for the last subpacket may not be sufficient for the purpose of MAC layer ARQ. Therefore, the ARQ feedback channel for the last subpacket may have a rate target which effects a lower error/erasure rate than the feedback channel for the other subpackets. The following discussion presents a way to enhance the reliability of the last NAK message, in the context of a 1xEV-DO system.

The feedback channel associated with 1xEV-DO RL is transmitted as a part of the 11xEV-DO Forward Link. The data channel, the pilot channel and the Feedback channel (also known as MAC channel) are time multiplexed into the 1xEV-DO forward link waveform.

The structure of the Forward Link waveform is based on the notion of half slots. In one embodiment, a half-slot refers to a time duration of 0.8333 msec, which contains 1024 chips (at a rate of 1.2288 Mcps). In each half slot, the pilot channel is transmitted in a burst of 96 chips. The feedback channel is transmitted in two bursts of 64 chips, one on each side of the pilot burst. The data channel is transmitted in two bursts of 800 chips, filling up the remaining space in the half-slot.

The pilot channel is used by the receiver for channel estimation. The feedback channel is decomposed into a Reverse Power Control (RPC) subchannel the ARQ channel. The RPC channel is used to carry power control commands (including busy bits), while the ARQ channel is used to carry the physical layer ACK/NAK messages from the base station (destination of reverse link packets) to the user terminals (source of reverse link packets). The total energy available in the feedback channel is shared between the power control commands and physical-layer ACK/NAK messages.

FIG. 16 illustrates a base station transceiver supporting one embodiment of the present invention. The base station 3000 includes a receiver 3002 and transmitter 3006 for communication with mobile stations within a wireless communication system. The base station 3000 further includes a DRC application unit 3004 for receiving a DRC data rate request from each mobile station supporting High Rate Packet. Data communications, a NAK/ACK processing unit 3010 for receiving acknowledgement messages from a mobile station supporting an automatic repeat transmission technique, such as ARQ or hybrid ARQ, and a power boost unit 3012 for applying the power boost factor to transmissions of subpackets. The base station 3000 further includes a packet processing unit 3014.

The base station 3000 receives data for transmission to a mobile station, wherein the data is to be transmitted in packets. The packet processing unit 3014 prepares the data into packets and subpackets for transmission. The packet processing unit 3014 performs the MAC layer processing. The packet processing unit 3014 generates the subpackets for processing, including the systematic bits and parity bits. The power boost unit 3012 determines the number of installments for application of the power boosting, and generates, stores and applies the power boost factors. In one embodiment, the power boost factors are dynamically adjusted, wherein the adjustment may be based on performance of a given communication with a given mobile station.

The NAK/ACK processing unit 3010 receives the NAK and/or ACK messages from the mobile stations. On receipt of a negative acknowledge message or NAK, the NAK/ACK processing unit 3010 initiates a retransmission of the subpacket. In an automatic retransmission scheme, once the total number of allowable retransmissions expires (i.e., all retransmissions have been transmitted), any NAK received results in higher layer processing of the subpacket, such as by the MAC layer. According to one embodiment of the present invention, when the number of power boost installments expires (i.e., all power boost installments have been transmitted), any NAK received results in termination of transmission of that subpacket, and processing passes to a higher layer.

Figure 17:
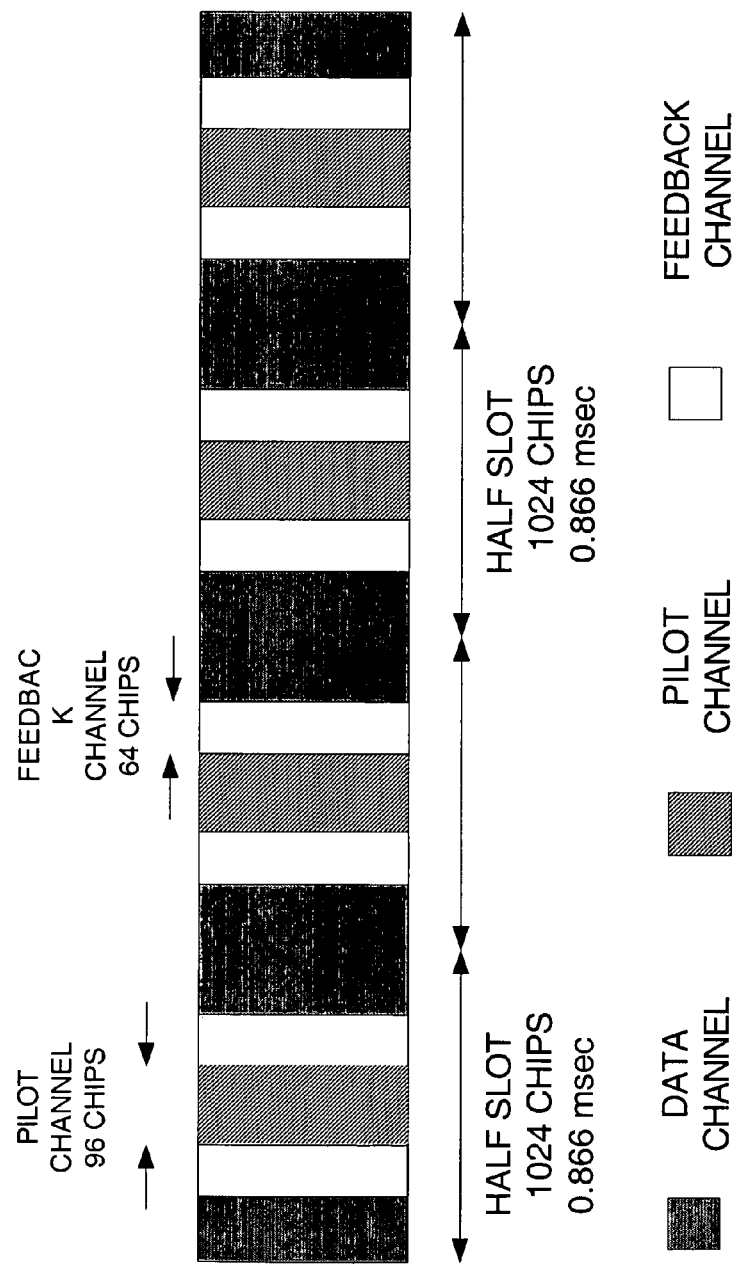
FIG. 17 is a channel structure in a wireless communication system.

FIG. 17 illustrates the channel structure of the including data channel, pilot channel, and feedback channel. The half slot is illustrated as 1024 chips. Each halfslot includes a pilot portion of 96 chips and two feedback channel portions of 64 chips each.

The feedback channel is used to receive feedback information simultaneously with multiple user terminals, each of which being identified by a user index (MAC index). The feedback channel is designed to support close to 64 users, each with a unique user index between 0 and 63. Associated with each user index i is a Walsh function $W_i$. The Walsh functions are binary-valued, periodic, discrete-time sequences, with the following two key properties:

1. If n is the smallest integer such that $i < 2^n$, then the fundamental period of the Walsh function $W_i$ is equal to $2^n$.
2. If i and j are distinct non-negative integers, both less than $2^n$ then the Walsh functions $W_i$ and $W_j$ are mutually orthogonal over a period of length 2 raised to the n.

Figure 18:
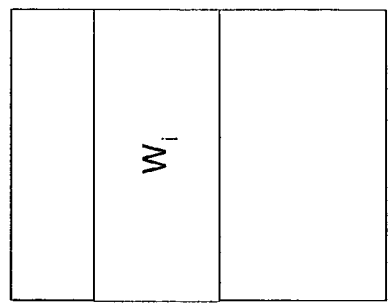
FIG. 18 illustrates use of different Walsh codes to identify each user on a feedback channel.

FIG. 18 illustrates the ACK/NAK on the feedback channel, wherein user i is identified by the Walsh index $W_i$. The power control ACK/NAK signal for the MAC layer is illustrated.

Figure 19:
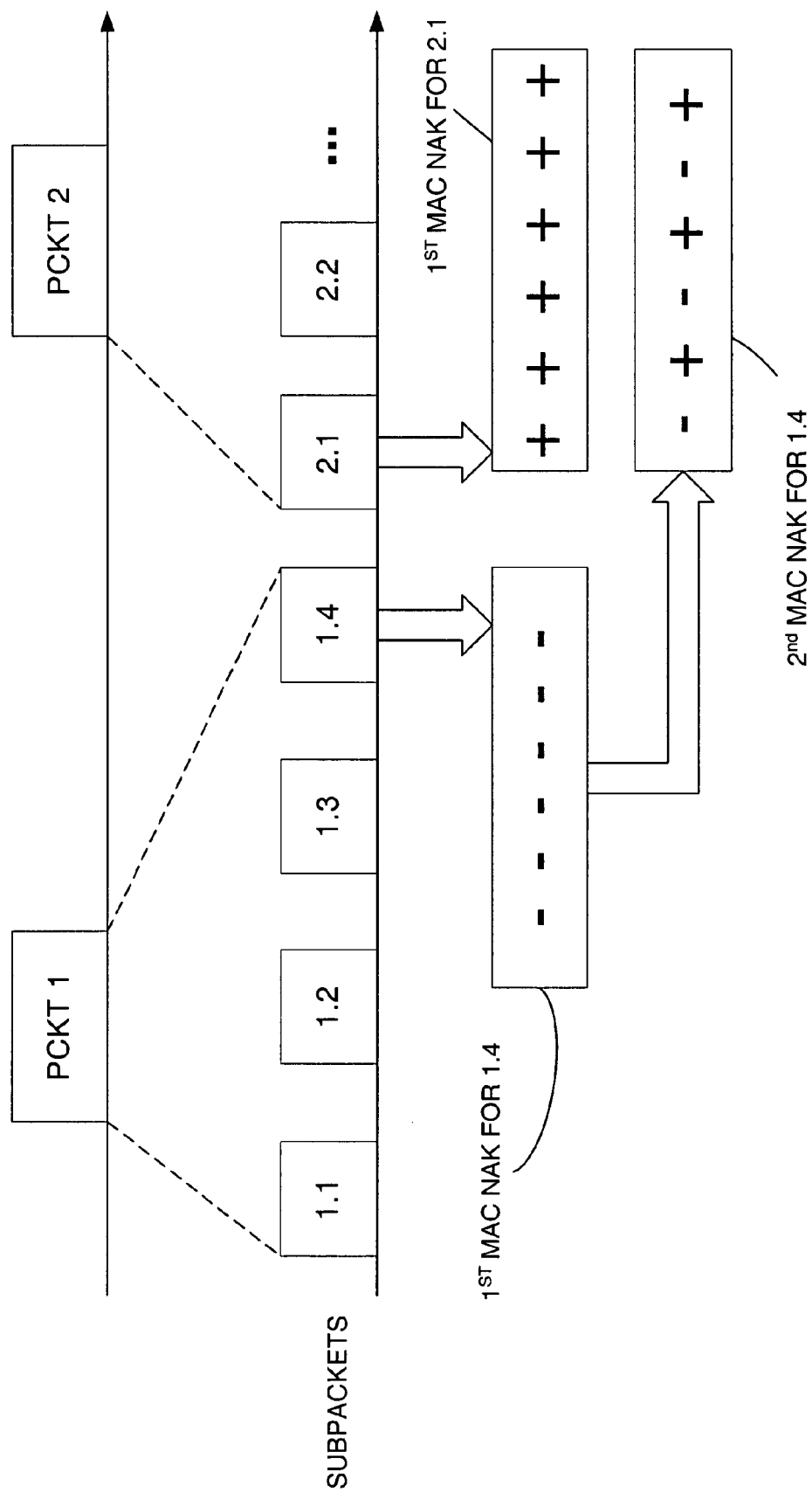
FIG. 19 is a scheme for providing multiple negative acknowledgments for a data packet wherein the negative acknowledgments are significant in a layer above the physical layer.

The following describes a method for increasing the accuracy of the last transmitted ACK/NAK on the feedback channel, wherein the power control commands and physical-layer ACK/NAK commands are transmitted simultaneously to multiple users. FIG. 19 illustrates application according to one embodiment. The power control command to a user terminal is a sequence of UP/DOWN commands. The UP/DOWN commands are sent to a terminal having user index i, by transmitting the complex-valued signal $((\pm 1) + j\, 0) W_i$ over a duration of multiple half slots (multiple of 128 chips). The ACK/NAK commands are sent to the terminal with user index i by transmitting the complex-valued signal $(0 \pm j\, 1) W_i$ over an integral number of half-slots.

Since i is greater than or equal to 0 and less than 64, the above scheme ensures that the feedback channels (RPC and ARQ channels) of distinct users are mutually orthogonal, within each 64-chip burst of the feedback channel. In addition, the RPC and ARQ channels of the same user are also mutually orthogonal, over the same duration.

Successive power control commands and successive ARQ commands are sent sequentially, so that successive symbols do not overlap in time. In the current scheme, the physical layer ACK/NAK message is transmitted over the same duration as the physical layer subpackets (4 slots). Moreover, the ACK/NAK message is transmitted at a fixed time offset relative to the associated sub-packet. This ensures that successive ACK/NAK messages, as well as successive power control commands, are mutually orthogonal. Alternate embodiment may provide the messages at alternate timing consistent with the needs and goals of a given system.

One embodiment improves the reliability of the physical-layer ACK/NAK messages by slowing down the power control rate. In this way each power control command is sent over a longer duration of time, but at lower power such that the energy in each power control bit is the same. The resulting power savings may be used to boost-up the power allocated to the ACK/NAK messages on the ARQ channel. This approach reduces the effectiveness of power control, while improving the effectiveness of hybrid ARQ. A well-designed system maximizes the overall link performance through an optimal tradeoff between RPC and ARQ reliability.

Another embodiment seeks to improve the reliability of the ARQ channel, without impacting power control by noting that the first few subpackets mostly result in physical-layer NAK messages, while the last few subpackets mostly result in a physical-layer ACK message. A few subpackets in the middle may generate a reasonable mix of both ACK/NAK messages. Hence, we may use ON-OFF keying in response to the first few and last few subpackets, while employing an antipodal signaling in response to the subpackets in the middle.

More explicitly, the physical-layer ACK and NAK messages for subpackets in the middle (subpacket index in the range [K1, N minus K2]) are transmitted with equal power relative to each other. In contrast, the NAK message of the first few subpackets (subpacket index in the range [1, K1)) may be sent with much less power than the ACK message for the same subpackets. Note according to one embodiment, the NAK message of the first few subpackets may be allocated zero power. Similarly, the ACK message of the first few subpackets (subpacket index in the range [1, K1)) may be sent with much less power than the NAK message for the same subpackets. Note according to one embodiment, the ACK message may be allocated zero power. If one of the messages is sent with zero power and the other sent with more than twice the power, relative to the power used for ACK/NAK associated with intermediate subpackets, the system may improve the reliability of the first few and/or last few ARQ messages while using the same average power as before. Alternatively, we may support a larger number of ARQ channels at the same reliability, using the same average power as before.

Robust ACK/NAK Message

As mentioned hereinabove, the last NAK message needs to be much more reliable than other messages. The following technique provides a way to further improve the reliability of this message. The method prolongs the transmit duration of the ACK/NAK message, while maintaining orthogonality with the neighboring ACK/NAK messages. Given a nominal transmit duration of an ACK/NAK message to be K half-slots, one embodiment transmits a "robust ACK/NAK" message over a duration of up to 3K. For a NAK message sent over multiple half slots, a different Walsh code or portion of a Walsh code is transmitted in each half slot. The robust NAK message may be sent by transmitting the signal $(0 \pm j\, 1) W_i$ over the first K half-slots, the signal $(0 \pm j\, 1) W(64+i)$ over the next K half-slots, and the signal $((\pm 1) + j\, 0) W(64+i)$ over the next K half-slots.

Within each half-slot, the "robust ACK/NAK" messages remain orthogonal to one another, as well as to the standard ACK/NAK messages, even though different messages may overlap in time. Note also that within a half-slot, the feedback channel is transmitted within a space of (128 plus 96) or 224 chips (0.183 msec), an order magnitude less than the coherence time of most wireless channels. Therefore, orthogonality is maintained without regard to channel variations due to fading, shadowing, etc.

FIG. 18 illustrates one application of the robust ACK/NAK message. As illustrated, a first packet is transmitted in four subpackets, wherein the first packet is labeled "PCKT 1" and the subpackets: 1.1; 1.2; 1.3; and 1.4. The NAK for the subpacket 1.4 is given in two portions, the first portion is identified as the $1^{st}$ MAC NAK for 1.4, and the second portion is identified as the $2^{nd}$ MAC NAK for 1.4. The 1st MAC NAK for 1.4 is given by the code - - - - - -, and the 2nd MAC NAK for 1.4 is given by the code -+-+-+. The $2^{nd}$ MAC NAK for 1.4 is transmitted concurrently with the $1^{st}$ MAC NAK for the first subpacket of the next packet, specifically subpacket 2.1 of PCKT 2.

By using this technique, it is possible to reduce the power used on the "robust ACK/NAK" message by a factor of 3, without degrading performance. Alternatively, the reliability of these messages may be improved considerably (especially in fading channels), using the same amount of power allocated to the standard ACK/NAK messages. This technique may be used in conjunction to the ON-OFF signaling technique, wherein the last ACK message is sent with very little or no power, resulting in reduced average power consumption for the last ARQ message, over a large number of users.

Those of skill in the art would understand that information and signals may be represented using any of a variety of different technologies and techniques. Fore example, data, instructions, commands, information, signals, bits, symbols, and chips that may be referenced throughout the above description may be represented by voltages, currents, electromagnetic waves, magnetic fields or particles, optical fields or particles, or any combination thereof.

Reverse Rate Indicator

Presented herein is a Reverse Rate Indicator (RRI) detection scheme and apparatus for application to a Reverse Link (RL) physical layer, wherein the detection scheme decodes the RRI for a new incoming packet using the knowledge of Forward Link (FL) ARQ information from a given base station. As defined in IS-856, the RRI is transmitted on the Reverse Traffic MAC Reverse Rate Indicator (RRI) Channel, which is the portion of the Reverse Traffic Channel that indicates the rate of the Reverse Traffic Data Channel. For the Reverse Traffic Channel that supports ARQ, the encoded RRI Channel symbols are code-division multiplexed with the Pilot Channel.

Figure 20:
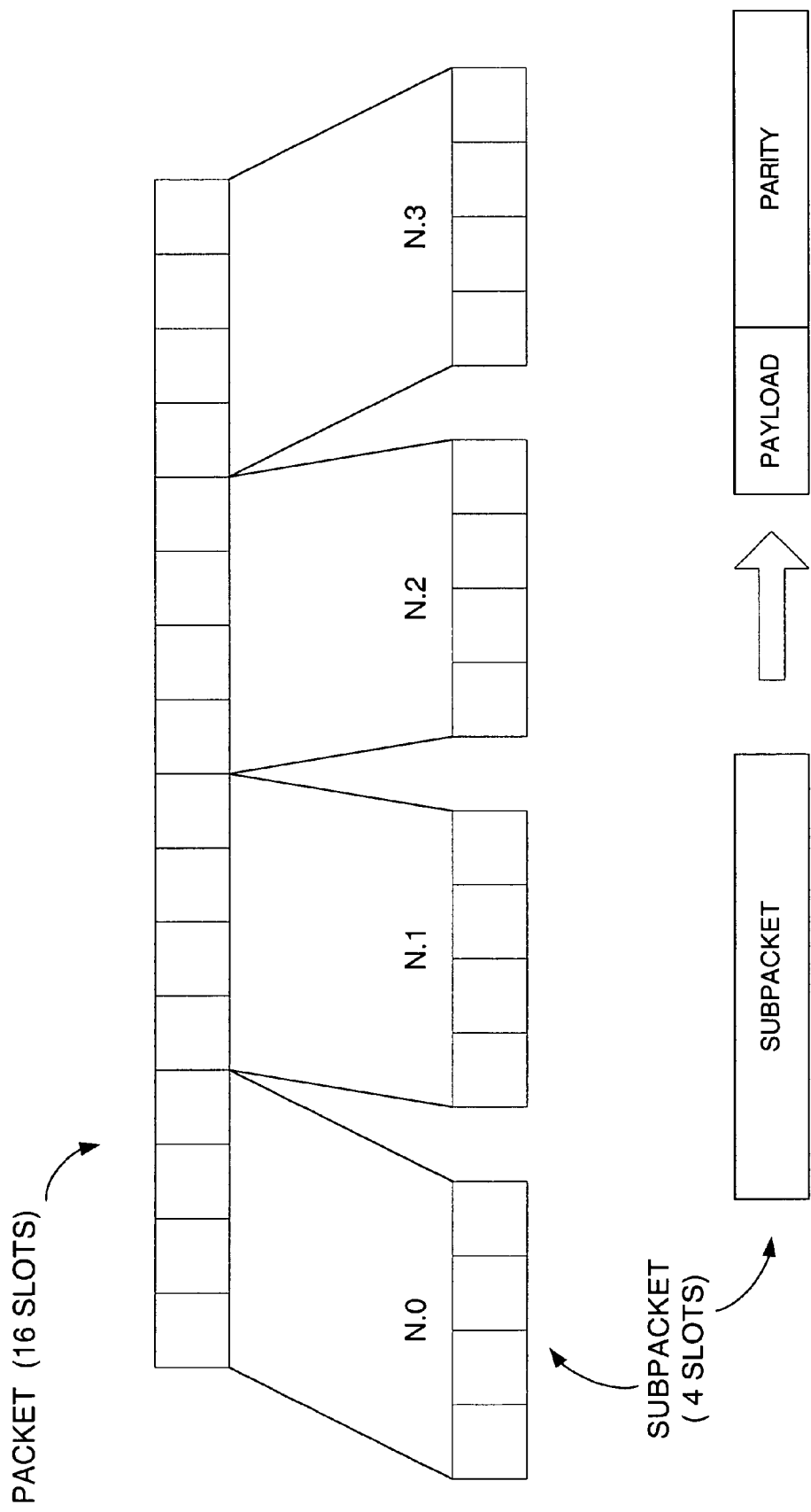
FIG. 20 is an example of transmission of a packet of data.

As illustrated in FIG. 20, a packet of data may be divided into a number of subpackets. In the present embodiment, a packet of data includes 16 slots, which is then grouped into subpackets each containing 4 slots. The RRI provides information as to the data rate at which the packet is transmitted. When the subpackets are transmitted sequentially together, it may be sufficient for the RRI to provide payload information. Each payload is indicated by bit length, wherein the payload bit length is associated with a known data rate. Smaller payloads may be transmitted using fewer bits, and thus at an effective lower data rate. Larger payloads may be transmitted using more bits, and thus at an effective higher data rate. When the packet is not received correctly, the entire packet is retransmitted. In this situation, the payload information may be sufficient information to decode a given packet; however, when transmission applies incremental redundancy, the receiver will require more information in order to decode and reconstruct the packet correctly. Incremental redundancy allows each subpacket to be retransmitted individually if that subpacket was not correctly received.

According to an incremental redundancy scheme, each subpacket is transmitted until the transmission of the subpacket is confirmed. In other words, a subpacket is transmitted, and if a negative acknowledgment is received, the subpacket is retransmitted. While there is a maximum allowable number of retransmissions defined, within a packet of data, each subpacket may be retransmitted a different number of times. The entire packet is not retransmitted, but rather each subpacket is treated individually. In this situation, the receiver requires information to reconstruct the packet given each individual packet. In other words, the receiver needs to identify individual subpackets within a packet.

Figure 21:
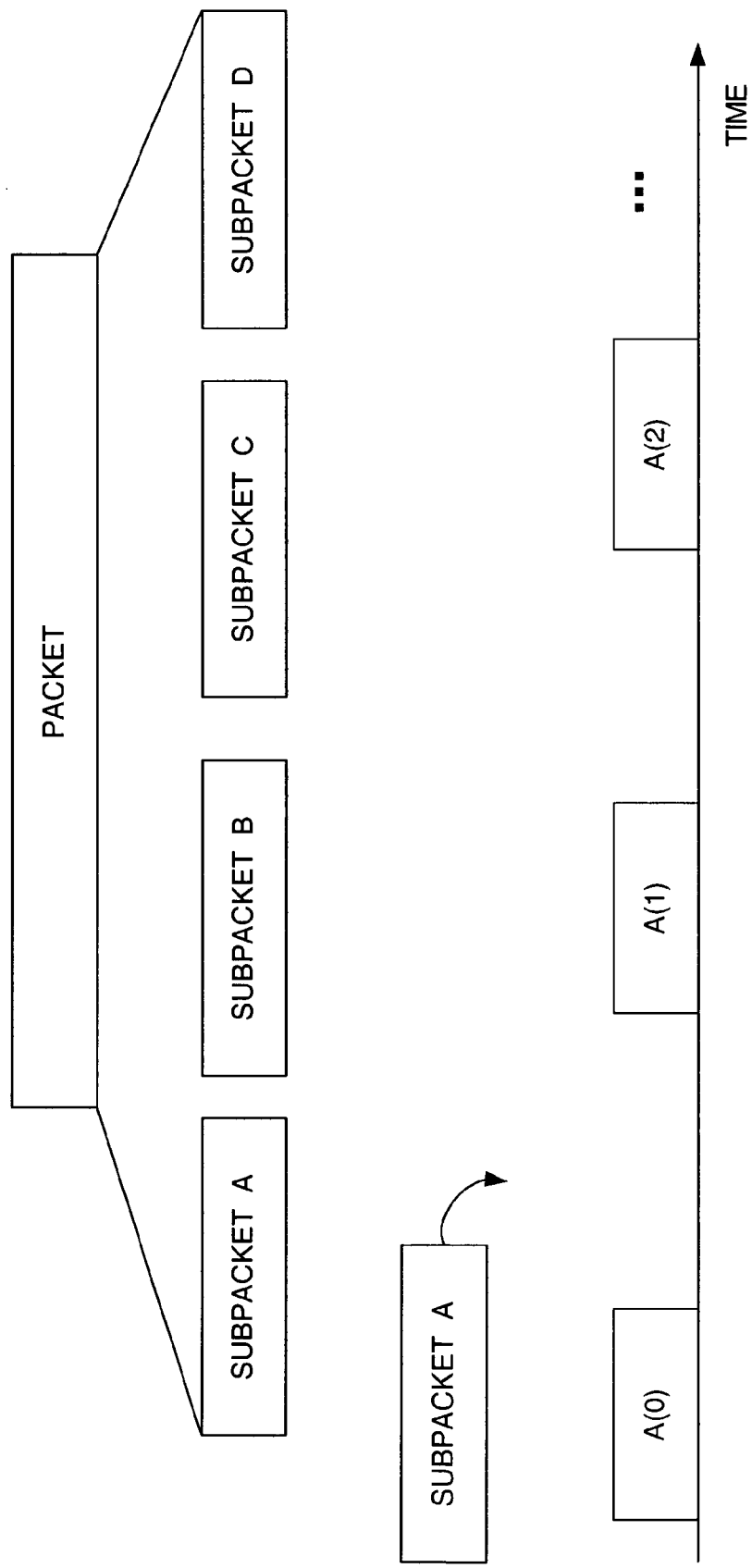
FIG. 21 illustrates incremental redundancy in transmission of subpackets.

An example of incremental redundancy is illustrated in FIG. 21. Here a packet of data includes subpackets A, B, C and D. Here the subpacket A is transmitted multiple times, each identified by an index (1), (2), etc. Note that each of the subpackets A, B, C, and D may be transmitted and retransmitted differently.

In one embodiment provided as an example, the RRI channel supports interlaced RL data packet transmission. The RRI is used to indicate the presence or absence of data, the corresponding data rate and the instance of subgroup transmission of data packet. In other words, the RL supports incremental redundancy in transmissions of subpackets, and the RRI then indicates the data rate, as well as identifies the specific subpacket within a packet. For a given packet, an interlace includes all of the subpacket transmissions and retransmissions for a given subpacket.

In this example, to optimize the decoding complexity versus performance trade off, the RRI is based on the Walsh code family. The number of information bits each RRI codeword carries, $N_{Info}$, is designed to satisfy the following condition:

$$2^{N_{Info}} \geq N_{rate} \times N_{group}, \qquad (2)$$

wherein $N_{rate}$ is the total number of available data rates (including the null rate) and $N_{group}$ is the maximum number of subgroups that a packet may be broken into during transmission. For decoding performance considerations, this example uses bi-orthogonal Walsh codes, so as to slightly reduce the increase in the number of minimum-distance neighbors to any codeword while we double the codeword space.

In one embodiment, RRI decoding may be based on the maximum-likelihood criterion by assuming all RRI codewords are transmitted with equal probability. The calculation then reduces to the minimum distance decoding defined by the following equation:

$$(g, i) = \arg_{\substack{(g', i') \\ 0 \leq g' \leq N_{group}-1 \\ 0 \leq i' \leq N_{rate}-1}} \min \sum_{j'=0}^{g'} \|(\tilde{R}_{k-j'}) - (R_{j'})_{i'}\|^2 \qquad (3)$$

wherein g indicates the index of the corresponding subgroup transmission of the data packet; i denotes the data rate of the packet; $(R_{j'})_{i'}$ represents the RRI codeword for the j'th subgroup transmission of a data packet of rate i'; and $(\tilde{R}_k)$ is the current received RRI codeword corresponding to the current subgroup transmission of data packet (thus $(\tilde{R}_{k-j'})$ represents the j'th-group earlier received RRI codeword for the same interlace as the current received RRI codeword).

While provision of the subpacket identifier or index in the RRI is sufficient information for decoding the packet, there is still great decoding complexity as the receiver must first decode the RRI. The receiver determines a number of hypotheses to try in order to decode the RRI. The number of hypotheses considers the number of available data rates, $N_{rate}$, and the number of allowable retransmissions per packet $N_{group}$. Each set of subpackets associated with a packet is referred to as a subframe. $N_{group}$ subframes from the same physical-layer packet form a frame. Note that the number of subpackets per packet may also be variable. With reference to Equ. (2), the total number of hypotheses, is equal to ($N_{rate} \times N_{group}$). In other words, the receiver must try all of the possibilities (i.e., hypotheses) to retrieve the RRI information. This number may be quite large given the interlaced RL ARQ structure. In addition, the minimum decoding distances is always 1 subframe, even when there are more than 1 subpackets per packet. This could potentially hurt the decoding performance under fading channels due to the lack of time-diversity.

In one embodiment, to reduce the RRI decoding complexity and improve the minimum decoding distance (and hence the performance) the Base Station (BS) RRI decoder utilizes previous packet decoding results for the current interlace to reduce the number of hypothesizes to be tested. In particular, the BS may assume that a NAK signal to the AT is absolutely reliable. For example, in a 4-slot RL structure as shown in FIG. 21, if the BS has not succeeded in decoding the 1$^{st}$ subgroup transmission of a data packet of rate i, the BS expects further transmissions of this subpacket. In other words, if subpacket A is received but decoded incorrectly, the BS expects further retransmissions of subpacket A. On accurate decode, the BS sends an ACK to the mobile station for this subpacket. In this situation, on receipt of the next RRI codeword of the same interlace, ie., subpacket A, the BS may limit the hypotheses for the 2$^{nd}$ subgroup to those of the same data rate i. In this way, the BS is able to ignore hypotheses for different rates. By using such information regarding prior interlace transmissions, the decoding complexity is greatly reduced. Specifically, the receiver is able to use historical information to make smart decisions for decoding a next received RRI. A further reduction in decoding complexity results from the observation that BS may start detection from the most recent ACK'ed subpacket, as any RRI information prior to this instance does not provide sufficient helpful information for packet decode. For example, if the AT has just sent subpacket 3 of packet A and this has been decoded successfully, the BS will send an ACK to the AT and then start RRI hypothesis testing from the following subframe. This also allows the receiver to reduce significant complexity in the detection process.

In one embodiment, the codeword includes a first portion designating the data rate information, and a second portion designating subpacket index information. The RRI codeword is transmitted on the RL as described hereinabove. Each data rate then has an associated RRI symbol. The RRI symbol is then expanded to an RRI codeword for transmission.

Figure 23:
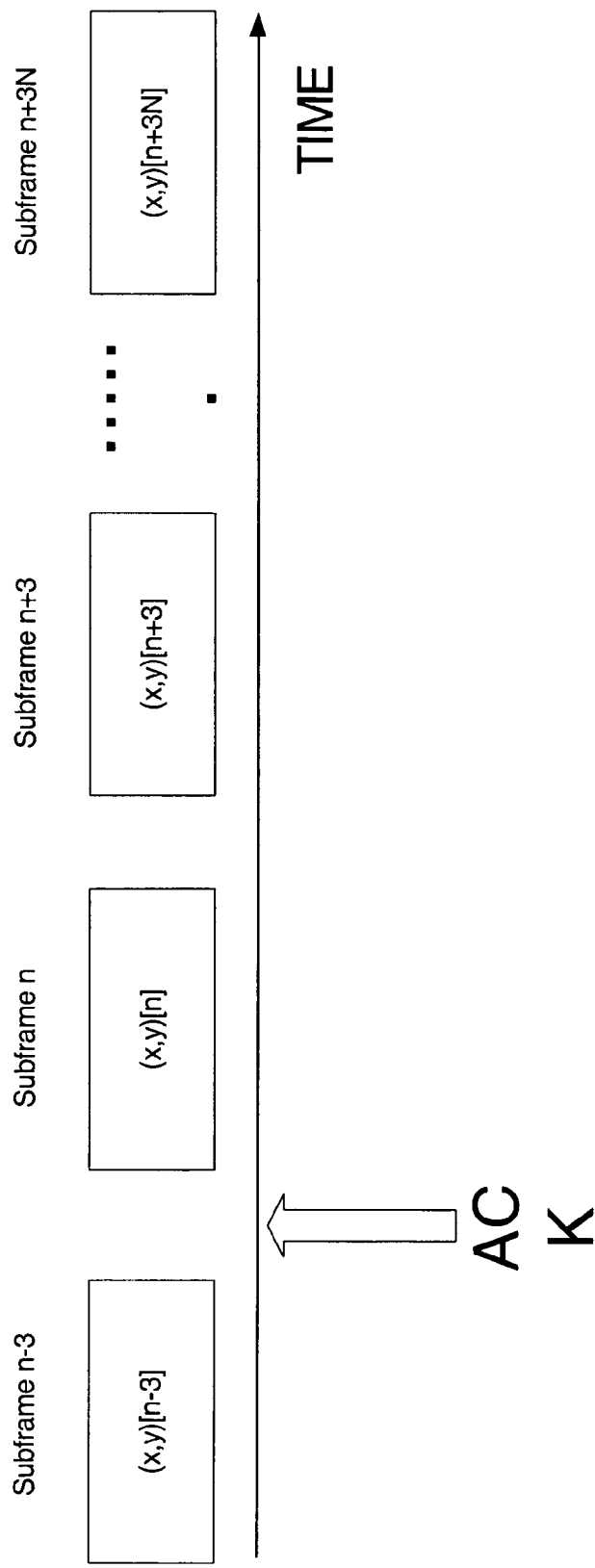
FIG. 23 illustrates sequential transmission of RRI in timing diagram form.

There is a one to one correspondence between payload size and data rate. As $$RRIWord(i,j)=(-1)^{i}W_{8\lfloor i/2 \rfloor+j}^{64}$$

illustrated in FIG. 23, each payload has an associated payload ID. Physical Layer (PL) sub-packet (e.g., 4-slot subpacket). The RRI codeword provides information to the receiver regarding the payload information of the long packet to which the sub-packet belongs, as well as providing the sub-packet index. FIG. 23 assigns a payload ID to each of the different types of PL packet payload sizes. In the present embodiment, each RRI codeword contains 6 bits of information. Four bits encode the payload ID, and the remaining two bits encode the sub-packet index (i.e. 0, 1, 2, or 3). The RRIs are encoded overall using 32-ary bi-orthogonal codes. For the i$^{th}$ payload ID and j$^{th}$ subpacket index, the RRI is encoded as:

$$RRIWord(i,j)=(-1)^{i}W_{8\lfloor i/2 \rfloor+j}^{64} \quad (4)$$

where $W_j^N$ denotes the jth length-N Walsh sequence.

An RRI detection algorithm is used at the receiver, e.g., BS, to decode the RRI. As the RRI transmission parameters change from packet to packet, and this information is not provided a priori to the receiver, it is incumbent upon the receiver to determine how to decode the RRI. As described above, one method may be considered brute force, wherein the receiver tries all possible data rates for decoding the RRI. The decoding is complicated further by the application of incremental redundancy. When the RRI is transmitted as a packet composed of multiple subpackets, each subpacket is considered in decoding the RRI information. Therefore, the index or identification of the subpacket is significant in decoding the whole packet. Thus, the exhaustive set of possible hypotheses includes all combinations of: (i) available data rate; and (ii) each possible subpacket within the packet. In one embodiment, 12 data rates are available and 4 slots are assigned per packet, resulting in 48 possible combinations, including the null data rate. Note, each data rate corresponds to a payload. While it is possible to decode each subpacket independently, doing so loses the advantage of being able to soft-combine the data across the subpackets to provide greater time-diversity and redundancy to combat adverse channel conditions. Hence, it is desirable to detect both data as well as RRI of a given packet by looking at all possible subpackets that have been sent so far. In one embodiment, an RRI detection algorithm performs sequence detection, wherein the decoding is performed over a window of RRI transmission subframes. Sequential detection multiplies the decoding complexity, i.e., the number of hypotheses, significantly. For a system having 4 subpackets per packet with 12 available data rates, and a resultant 48 possible hypotheses, consideration of 2 subpackets will result in (48×48) possible hypotheses. In other words, as each subpacket is considered with respect to each of the 48 hypotheses. Consideration of 4 slots results in (48×48×48×48) possible hypotheses. Therefore, design of a sequential detection algorithm seeks to: (i) minimize the number of possible hypotheses; and (ii) maximize the minimum decoding distances between these hypotheses. Without optimization, sequential detection carried out over 16-slot detections for all possible payload and subpacket ID combinations over a given interlace, may result in 4100625 hypotheses, given a minimum-distance of 4-slots. Thus the need for a more efficient decoding algorithm or enhancement to sequential detection to reduce the number of hypotheses.

Even though such RRI complications are caused naturally by the physical-layer hybrid ARQ structure, this structure turns out to help us as well. For forward link ARQ channel detection at the mobile station, generally the false alarm rate, i.e., interpreting a NAK signal as an ACK, is limited so as to be extremely low (about 0.1%). For example, this may be ensured via an erasure decoder when the subpacket ID is less than 3. Therefore, it is assumes that a NAK for a given subpacket, will be correctly interpreted by the mobile station. For example, if the mobile station sends a packet with payload ID 3 and subpacket ID 1, and the BS sends a NAK for this subpacket, the BS assumes that the only possible transmission at the next instance will be the same packet with subpacket ID 2. With this assumption, and several other common sense rules, we can now significantly improve the RRI detection performance and complexity. In this way, the detection algorithm determines those hypotheses which is not possible given the history of transmissions received. Typically, for a subpacket received after receipt of an ACK, the BS tries the full set of all possible hypotheses. However, for a NAK, which is more reliable than an ACK and received much often, a reduced set of hypotheses is possible.

Figure 25:
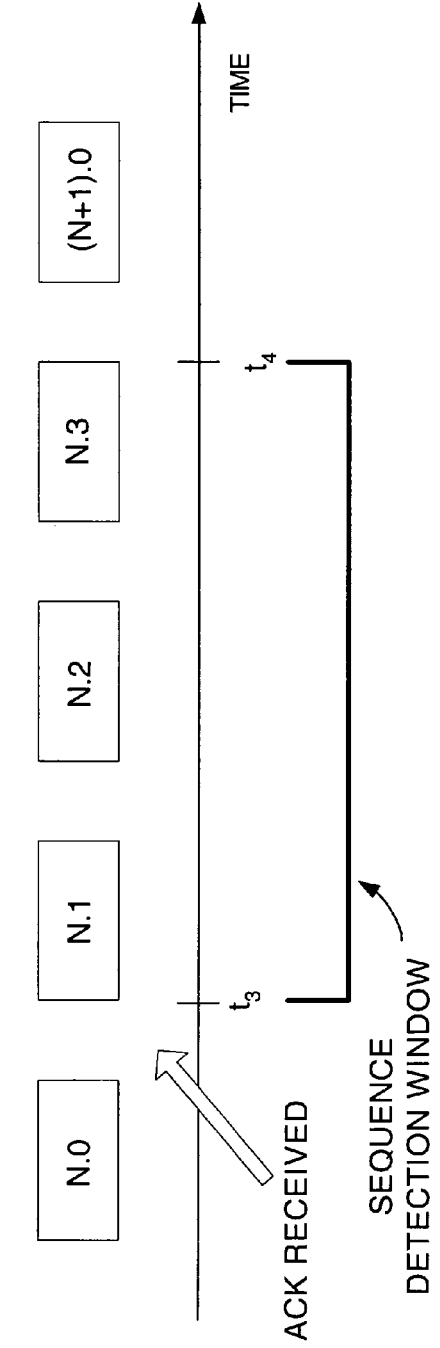
FIG. 25 illustrates a sequence detection window of subpackets in a transmission.

FIG. 25 illustrates an RRI transmission over time. For clarity, each subframe is illustrated with a transmission index identifying the frame. The pair (x,y) denotes the RRI word with payload ID x and subpacket ID y. A subframe denotes the 4-slot duration of a subpacket, wherein (x[n],y[n]) denotes the received RRI word during the nth subframe. With reference to FIG. 25, the RRI sequence detection starts at subframe n, just after the BS has sent a most recent ACK for subframe (n−3). Then, for the RRI sequence that spans subframes n, n+3, n+6 . . . n+3N, where n+3N denotes the current subpacket, the BS checks for valid hypotheses with respect to RRI sequences that obey the following RRI detection Rules.

RRI Detection Rules

Let m=n+3i for i=0, 1, 2, . . . N, then:
  Rule 1: If y[m]=y[m−3]+1, then x[m]=x[m−3].
  Rule 2: If x[m−3]=0, then y[m]=0.
  Rule 3: If x[m−3]>0 and m>n, then y[m]=(y[m−3]+1) mod 4.
  Rule 4: If x[m−3]>0 and m=n, then y[m]=(y[m−3]+1) mod 4 or 0.

Figure 26:
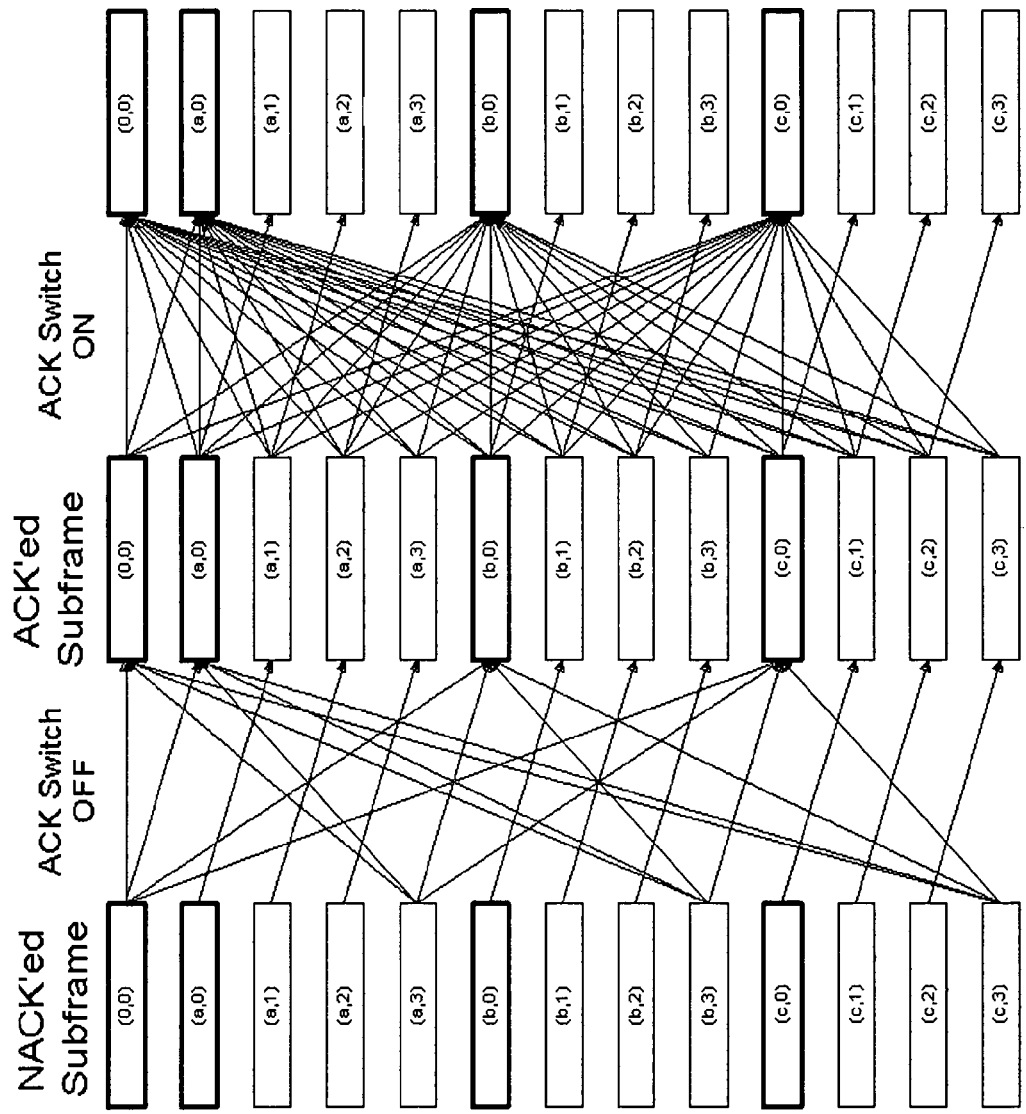
FIG. 26 is trellis diagram illustrating a method for decoding.

Note that the detection process may last for a long time if the mobile does not have data to send, as the BS awaits an accumulation of instances. To conserve system memory, one embodiment confines the trace back length (as measured in number of subframes) to at most 3 subframes, since a given packet can contain at most 4 subpackets. This leads to the assumption that a new subpacket arrives on a given interlace at subframe n, wherein the most recent ACK occurs later than subframe (n−3M). For M<4, RRI sequence detection begins at subframe (n−3(M−1)) by applying detection rules 1 through 4. For M=4 or higher, RRI detection beings at subframe (n−9) by apply rules 1 through 3 only. FIG. 26 illustrates the possible RRI detection scenarios and hypotheses given these rules. Here the number of possible hypotheses has been effectively limited.

For implementation of such an RRI detection scheme in hardware, the design applies a systematic structure. For a given mobile station in the previously defined embodiment having multiple available data rates and 4 subpackets per packet, at any given instance, there may be 45 possible hypotheses (states) for a received RRI word at a current subframe. Let (x,y) denote the state corresponding to the hypothesis that the current received RRI word has payload ID x and subpacket ID y. For each state (x,y) at subframe n, maintain four metrics $M(x,y)_i[n]$ for i=0, 1, 2, and 3. These metrics may be generated as follows:

Rule 5: If y>0, then x'=x and y'=y−1;
  Rule 6: If y=0 and ARQ[n−3]=NAK, then y'=3 if x'>0 and y'=0 if x'=0.

To compare the likelihood of different hypotheses, we use a final metric for each state. At the given time and state, this metric depends on when the most recent ACK was sent. For RRI detection of subframe n, wherein the last ACK was sent at subframe n−3*l, if (l<4), the final metric for hypothesis (x,y) will be $M(x,y)_{l-1}[n]$. If l exceeds 4 (i.e., the ACK occurs more than 4 subframes ago), the final metric for state (x,y) will be $M(x,y)_3[n]$.

In addition, upon sending an ACK for the current subpacket at subframe n, the system resets the metrics for all states. For a state corresponding to a correct hypothesis (determined by a transmitted ACK), the BS maintains current metric values. For all other states, the BS resets parameters to negative infinity (or the absolute minimum value). This assures that in operation, the RRI detection process is conditioned on historical information. In the subframe following the subpacket corresponding to the transmitted ACK, the BS turns on an ACK switch for this instance so that the states corresponding to subpacket ID 0 are connected with all states from the previous subframe.

In an HRPD system, the access terminal sends an RRI signal to the access network indicating the payload, data rate, and subpacket index. All of this information may be used in an RRI detection scheme. Such information identifies the subpacket within a packet allowing the receiver to reconstruct the packet, as systems desire a variable packet structure. While described embodiments consider a packet having four subpackets, alternate systems may employ any number of subpackets per packet while applying the concepts described herein.

From the access terminal an RRI codeword is associated with each physical layer subpacket. RRI codeword provides information to the receiver regarding payload information of the long packet to which the subpacket belongs. Additionally, the RRI codeword identifies the subpacket identifier. In one embodiment, an RRI codeword including a data rate information portion and a subpacket index portion. The makeup of the RRI codeword is then detailed in the table, wherein each available data rate is provided in kbps and is mapped to the corresponding RRI symbol and codeword.

FIG. 22 provides a table of RL Physical Layer Packer Parameters which are used to map payload identifiers (ID) to each of the physical layer payload sizes, wherein the payload sizes are given in bit length. According to one embodiments, each RRI codeword includes 6 bits of information. Four bits used to encode payload ID (i.e., data rate information as there is a one-to-one mapping of payload to data rate) with remain- $$M(x,y)_i[n] = \begin{cases} Corr(RRIWord(x,y), RxRRI[n]) & i=0 \\ \max_{(x',y') \in A(x,y,ARQ[n-3])} \{M(x',y')_{i-1}[n]\} + Corr(RRIWord(x,y), RxRRI[n]) & 1 \le i \le 3 \end{cases}$$

wherein Corr(RRIword(x,y), RxRRI[n]) denotes correlation between the received RRI symbols and the RRI word corresponding to state (x,y), and A(x,y,ARQ[n−3]), a set that depends on (x,y) and ARQ[n−3] (ACK or NAK for the previous subframe) and consists of all possible collections of (x',y') for x'=0, 1, . . . , 11 and y'=0, 1, 2, 3 that satisfy the following rules.

ing 2 to encode the subpacket index. The RRI is then encoded using a 32-ary bi-orthogonal code. The ith payload ID and the jth subpacket index result in an RRI encoded as: $(-1)^i Walsh_{8\lfloor j/2 \rfloor + j}^{64}$.

FIG. 23 illustrates data rates mapped to data channel gain, wherein the gain is given in dB. The RRI may include the data rate information as the payload information. For a given data rate, an RRI symbol is applied. Additionally, each RRI symbol corresponds to an RRI codeword. In one embodiment, the RRI symbol includes 3 bits, and the RRI codeword includes 7 bits.

As a specific example of an embodiment of the present invention, the mobile station may employ any of 11 data rates for transmission of the RRI. The data rates are given as x=0, 1, 2, ..., 10, wherein x=0 corresponds to the null set. For a fixed ratio of payload to parity, the resulting subpacket size will vary. In this way, the RRI may be any one of 12 different data rates. As there are 4 potential subpackets within a given packet, there are therefore 48 possibilities of combinations thereof. Keeping in mind the one-to-one mapping of payload size to data rate, indicates the subpacket size incurs a different number of retransmissions.

Figure 24:
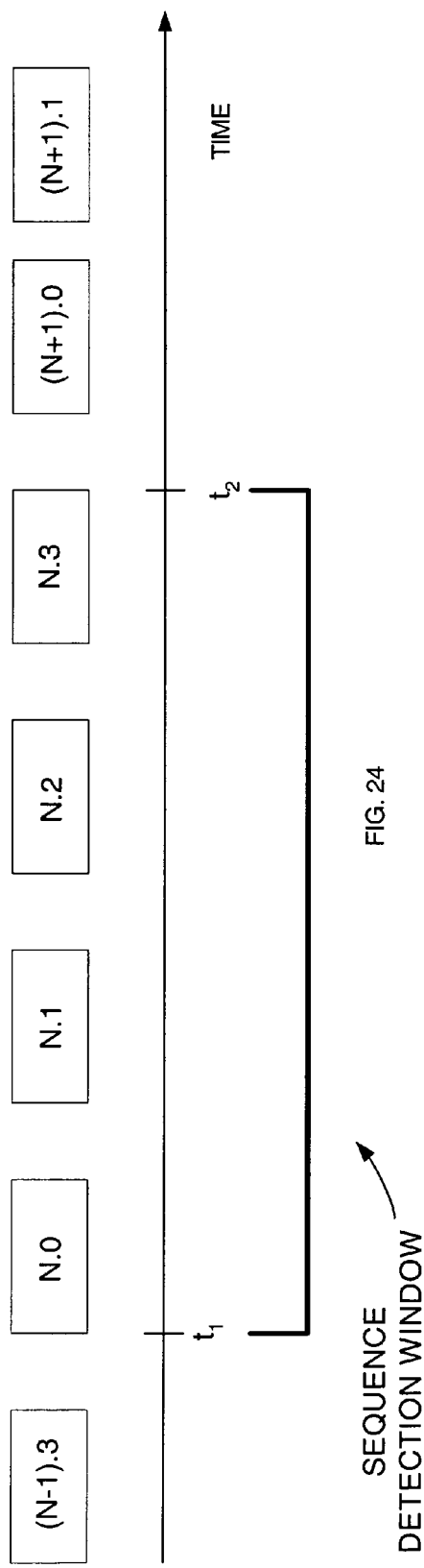
FIG. 24 illustrates a sequence detection window of subpackets in a transmission.

At the receiver there is a determination made as to what portion of the packet was transmitted. By using historical transmission information and eliminating those possibilities which are not valid, the BS is able to decode the RRI with less effort. FIG. 24 illustrates transmission of RRI subpackets, wherein the receiver receives the subpackets in the order shown. A window is used to determine the specific subpackets included in a sequential RRI detection. As illustrated, the window begins at time $t_1$ and continues to time $t_2$. The window is referred to as the sequential detection window. In other words, the method considers all subpackets within the window to determine if the decode is successful.

The first endpoint of the window is set when the mobile station transmits a first subpacket in a packet. For decode purposes, the first packet is evaluated in isolation. Subsequently the second subpacket in the sequence (still of the same packet as the first subpacket) is received at the receiver. The second subpacket is included in the window, wherein the receiver considers the first and second subpackets in determining if the decode is accurate. According to the present embodiment, the process continues until the window includes all of the subpackets in a packet. Note alternate embodiments may include a smaller portion of the packet. At this point, in effect, the receiver is decoding the entire packet together.

FIG. 25 illustrates a specific example, wherein receipt of an ACK is indicated at or before time $t_3$. Again, the window continues to include additional subpackets as they are received until a maximum number of subpackets is reached. The receiver is still required to determine the parameters, e.g., data rate, for correct decoding at receipt of each subpacket.

FIG. 26 illustrates a trellis structure 400 for eliminating hypotheses for decoding a subpacket of the RRI transmission. The trellis illustrates each possible situation or state of the receiver, wherein each situation provides a starting point and guides the path. The first column corresponds to decisions made when a NAK has been received for a given subpacket. An entry (a,0) corresponds to a first subpacket in the packet, and specifically in response to the transmission of this subpacket, the BS received a NAK. Receipt of a NAK typically means there will be a retransmission unless the maximum number of retransmissions has been reached. This entry is labeled (a,0). The second index refers to the number of retransmissions. The next column corresponds to a next sequential situation or state. From the middle state there are many more options for traversing a path through the trellis. Note that the trellis indicates that an ACK has been received for the corresponding state.

Figure 27:
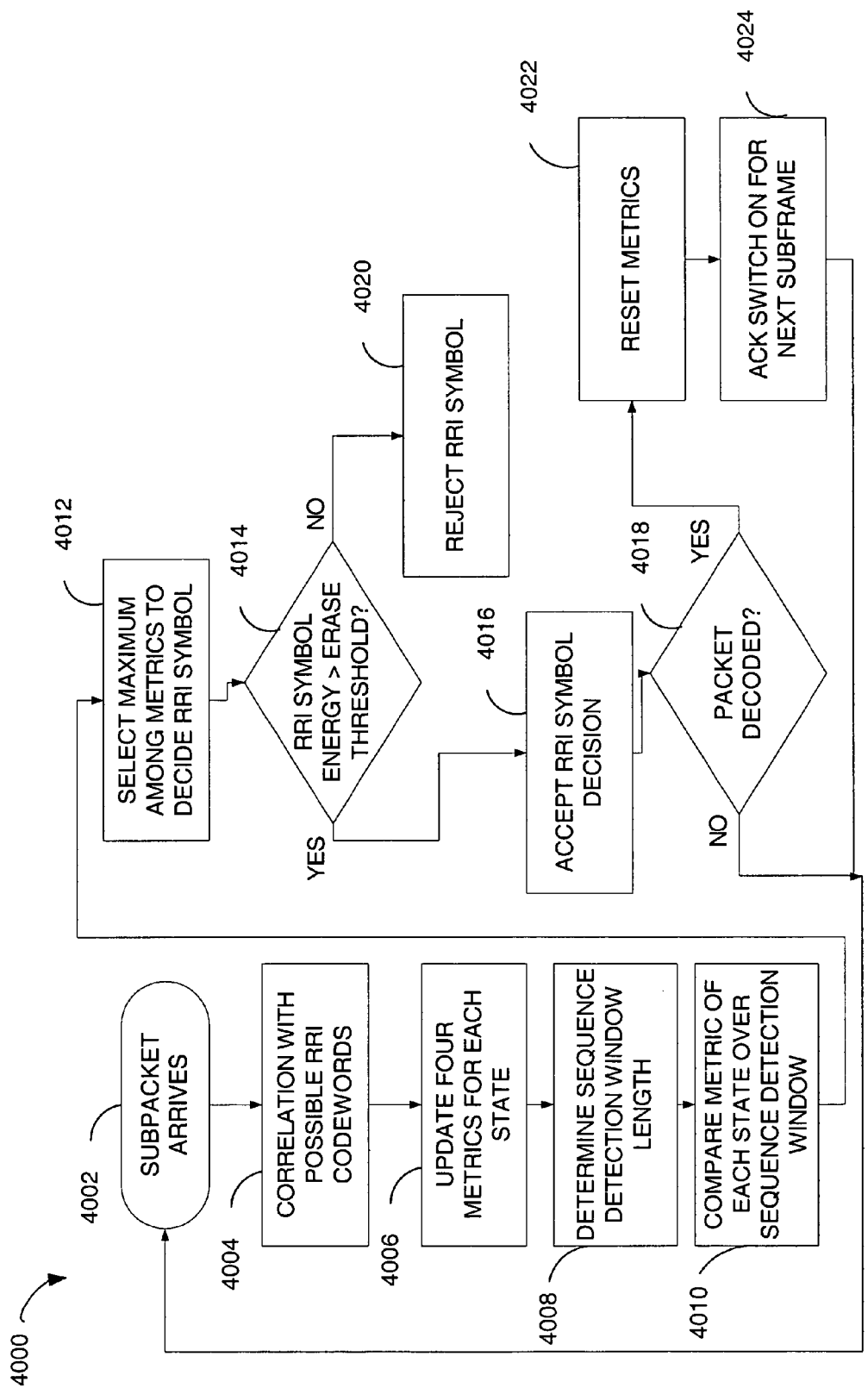
FIG. 27 is a method for decoding in a system supporting incremental redundancy of subpacket transmissions.

By traversing the trellis using the current situation, the number of detection hypotheses may be reduced resulting in quicker processing. FIG. 27 illustrates an RRI detection method according to one embodiment. As illustrated, the method 4000 begins on receipt of a subpacket, 4002. The receiver correlates the possible RRI codewords, i.e., forms a set of hypotheses, 4004. The receiver updates the metrics for each state. The sequence detection window length is determined, 4008. The metrics corresponding to each state are evaluated over the sequence detection window. Processing continues to select a maximum among the metrics in order to determine which RRI symbol was transmitted, 4014. The energy of the RRI symbol is then compared to a threshold value, 4014. If the energy of the RRI symbol exceeds the threshold, processing continues to step 4016 to accept the RRI symbol decision, 4016. If the energy is below or at the threshold value, the RRI symbol is rejected at step 4020. At step 4018 the receiver determines if the packet was decoded correctly. Once the packet is decoded correctly, 4018, the process continues to step 4022 to reset the metrics. The ACK switch is then set for the next subpacket.

As disclosed herein, a base station or other receiver is able to reduce the decode burden incurred by implementation of an incremental redundancy scheme and allowance of a variety of payloads, data rates, etc. The current state information, as well as historical information is used to eliminate any hypotheses that clearly can not hold for the next RRI transmission receipt. While described herein as a method for detecting RRI information, the present invention is applicable to other systems wherein the receiver does not receive information specific and sufficient for correct decoding. When the receiver needs to determine the parameters of decoding, a separate channel is used to provide this information. In the present case, the RRI may be retransmitted according to a hybrid ARQ format. Alternate redundancy schemes may be applied to this and other systems.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmission of packetized data in a wireless communication system having a designated packet error rate, the method comprising:
   determining at a transceiver a first number of installments for transmission of a first subpacket of data;
   determining a second number of installments for transmission of the first subpacket of data, the second number less than the first number;
   determining power boost gain factors for the second number of installments using latency tolerance information, the power boost gain factors satisfying the designated packet error rate;
   power boosting transmissions of the second number of installments of the first subpacket of data by applying the power boost gain factors; and
   terminating transmission of the first subpacket of data after the second number of installments.

2. The method as in claim 1, wherein the power boosting gain factors are nominally set to (N/M), wherein N is the first number of installments, and M is the second number of installments.

3. The method as in claim 1, wherein terminating transmission of the first subpacket of data comprises:
   initiating a second subpacket of data after the second number of installments.

4. The method as in claim 1, wherein the first number of installments for the first subpacket of data corresponds to a first time period, wherein terminating transmission of the first subpacket of data comprises:
   waiting for expiration of the first time period; and
   initiating transmission of a second subpacket of data after expiration of the first time period.

5. The method as in claim 1, further comprising:
   receiving a negative acknowledgement message after transmission of the second number of installments; and
   processing the first subpacket of data at a higher layer.

6. The method as in claim 1, further comprising:
   receiving an acknowledgement message before transmission of all of the second number of installments; and
   initiating transmission of a second subpacket of data.

7. An apparatus for transmission of packetized data in a wireless communication system having a designated packet error rate, the apparatus comprising:
   means for determining a first number of installments for transmission of a first subpacket of data;
   means for determining a second number of installments for transmission of the first subpacket of data, the second number less than the first number;
   means for determining power boost gain factors for the second number of installments using latency tolerance information, the power boost gain factors satisfying the designated packet error rate;
   means for power boosting transmissions of the second number of installments of the first subpacket of data by applying the power boost gain factors; and
   means for terminating transmission of the first subpacket of data after the second number of installments.

8. The apparatus as in claim 7, wherein the power boosting gain factors are nominally set to (N/M), wherein N is the first number of installments, and M is the second number of installments.

9. The apparatus as in claim 7, wherein means for terminating transmission of the first subpacket of data comprises:
   means for initiating a second subpacket of data after the second number of installments.

10. The apparatus as in claim 7, wherein the first number of installments for the first subpacket of data corresponds to a first time period, wherein means for terminating transmission of the first subpacket of data comprises:
    means for waiting for expiration of the first time period; and
    means for initiating transmission of a second subpacket of data after expiration of the first time period.

11. The apparatus as in claim 7, further comprising:
    means for receiving a negative acknowledgement message after transmission of the second number of installments; and
    means for processing the first subpacket of data at a higher layer.

12. The apparatus as in claim 7, further comprising:
    means for receiving an acknowledgement message before transmission of all of the second number of installments; and
    means for initiating transmission of a second subpacket of data.

13. A computer-program product for transmitting packetized data in a wireless communication system having a designated packet error rate, the computer-program product comprising a non-transitory computer-readable medium having instructions thereon, the instructions comprising:
    code for determining a first number of installments for transmission of a first subpacket of data;
    code for determining a second number of installments for transmission of the first subpacket of data, the second number less than the first number;
    code for determining power boost gain factors for the second number of installments using latency tolerance information, the power boost gain factors satisfying the designated packet error rate;
    code for power boosting transmissions of the second number of installments of the first subpacket of data by applying the power boost gain factors; and
    code for terminating transmission of the first subpacket of data after the second number of installments.

14. The computer-program product as in claim 13, wherein the power boosting gain factors are nominally set to (N/M), wherein N is the first number of installments, and M is the second number of installments.

15. The computer-program product as in claim 13, wherein the code for terminating transmission of the first subpacket of data comprises:

code for initiating a second subpacket of data after the second number of installments.

16. The computer-program product as in claim 13, wherein the first number of installments for the first subpacket of data corresponds to a first time period, wherein the code for terminating transmission of the first subpacket of data comprises:

code for waiting for expiration of the first time period; and
code for initiating transmission of a second subpacket of data after expiration of the first time period.

17. An apparatus for transmission of packetized data in a wireless communication system having a designated packet error rate, the apparatus comprising:

a processor;
memory in electronic communication with the processor;
instructions stored in the memory, the instructions being executable to:
    determine a first number of installments for transmission of a first subpacket of data;
    determine a second number of installments for transmission of the first subpacket of data, the second number less than the first number;
    determine power boost gain factors for the second number of installments using latency tolerance information, the power boost gain factors satisfying the designated packet error rate;
    power boost transmissions of the second number of installments of the first subpacket of data by applying the power boost gain factors; and
    terminate transmission of the first subpacket of data after the second number of installments.

18. The apparatus as in claim 17, wherein the power boosting gain factors are nominally set to (N/M), wherein N is the first number of installments, and M is the second number of installments.

19. The apparatus as in claim 17, wherein terminating transmission of the first subpacket of data comprises:
    initiating a second subpacket of data after the second number of installments.

20. The apparatus as in claim 17, wherein the first number of installments for the first subpacket of data corresponds to a first time period, wherein terminating transmission of the first subpacket of data comprises:
    waiting for expiration of the first time period; and
    initiating transmission of a second subpacket of data after expiration of the first time period.

* * * * *